(12) United States Patent
Okada et al.

(10) Patent No.: US 11,839,835 B2
(45) Date of Patent: Dec. 12, 2023

(54) SIMULATED MOVING-BED TYPE CHROMATOGRAPHIC SEPARATION METHOD AND SIMULATED MOVING-BED TYPE CHROMATOGRAPHIC SEPARATION SYSTEM

(71) Applicant: ORGANO CORPORATION, Tokyo (JP)

(72) Inventors: Kazuo Okada, Tokyo (JP); Masahiro Ogino, Tokyo (JP); Kohei Sato, Tokyo (JP); Masaki Tsuruta, Tokyo (JP); Toshiki Miyajima, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 384 days.

(21) Appl. No.: 17/277,077

(22) PCT Filed: Oct. 8, 2019

(86) PCT No.: PCT/JP2019/039702
§ 371 (c)(1),
(2) Date: Mar. 17, 2021

(87) PCT Pub. No.: WO2020/100471
PCT Pub. Date: May 22, 2020

(65) Prior Publication Data
US 2022/0032208 A1    Feb. 3, 2022

(30) Foreign Application Priority Data

Nov. 16, 2018  (JP) ................................. 2018-215950
May 8, 2019    (JP) ................................. 2019-088523

(51) Int. Cl.
*B01D 15/18*    (2006.01)
*G01N 30/44*    (2006.01)

(52) U.S. Cl.
CPC ....... *B01D 15/185* (2013.01); *B01D 15/1828* (2013.01); *G01N 30/44* (2013.01); *B01D 2215/024* (2013.01)

(58) Field of Classification Search
CPC .............. B01D 15/185; B01D 15/1828; B01D 2215/024; G01N 30/44
See application file for complete search history.

(56) References Cited

U.S. PATENT DOCUMENTS

| 4,031,156 A | 6/1977 | Geissler et al. |
| 5,223,143 A | 6/1993 | Takayuki et al. |

(Continued)

FOREIGN PATENT DOCUMENTS

| CN | 2484564 Y | 4/2002 |
| CN | 101391159 A | 3/2009 |

(Continued)

OTHER PUBLICATIONS

Mata, V., and A. Rodrigues, "Separation of ternary mixtures by pseudo-simulated moving bed chromatography", Journal of Chromatography A, 939, pp. 23-40. (Year: 2001).*

(Continued)

*Primary Examiner* — Benjamin L Lebron
(74) *Attorney, Agent, or Firm* — GREENBLUM & BERNSTEIN, P.L.C.

(57) ABSTRACT

A simulated moving-bed type chromatographic separation method separating a weakly adsorptive component, a strongly adsorptive component, and an intermediately adsorptive component, with eluents by using a circulation system in which a plurality of unit packed columns packed with an adsorbent are connected in series and in an endless form via pipes in which a feed solution supply port F, two or more eluent supply ports D corresponding to the eluents, an extraction port A of a fraction containing the weakly (Continued)

adsorptive component, an extraction port B of a fraction containing the intermediately adsorptive component, and an extraction port C of a fraction containing the strongly adsorptive component are provided in the pipes of the circulation system, and positions of the ports F, A, B, and C are set to have a specified relationship.

13 Claims, 8 Drawing Sheets

(56) References Cited

U.S. PATENT DOCUMENTS

| | | | |
|---|---|---|---|
| 5,770,088 | A | 6/1998 | Ikeda et al. |
| 8,752,417 | B2 * | 6/2014 | Valery .............. B01D 15/1864 73/61.53 |
| 2012/0071691 | A1 | 3/2012 | Wei |
| 2014/0251912 | A1 | 9/2014 | Agrawal et al. |

FOREIGN PATENT DOCUMENTS

| | | |
|---|---|---|
| CN | 101402003 A | 4/2009 |
| CN | 103961902 A | 8/2014 |
| CN | 106166402 A | 11/2016 |
| JP | 10-860 A | 1/1998 |
| JP | 2006-064631 A | 3/2006 |
| JP | 2007-064944 A | 3/2007 |
| JP | 4606092 B2 * | 1/2011 |
| JP | 4606092 B2 | 1/2011 |
| JP | 2014-029294 A | 2/2014 |
| JP | 2017-037048 A | 2/2017 |
| JP | 2017-205721 A | 11/2017 |
| JP | 2018-4567 | 11/2018 |
| WO | 2006/116886 A1 | 11/2006 |
| WO | 2009/122281 A1 | 10/2009 |
| WO | 2010/079060 A1 | 7/2010 |
| WO | 2012/172190 A1 | 12/2012 |
| WO | 2013/005046 A1 | 1/2013 |
| WO | 2016/053484 A1 | 4/2016 |

OTHER PUBLICATIONS

CN 106166402, machine translation.*
Machine translation of JP 4606092.*
Kim, J. et al., "Single-Cascade Simulated Moving Bed Systems for the Separation of Ternary Mixtures", Ind. Eng. Chem. Res., vol. 42, 2003, pp. 4849-4860.
International Search Report issued in International Patent Application No. PCT/JP2019/039702, dated Dec. 24, 2019, along with English translation thereof.
Written Opinion of the International Searching Authority issued in International Patent Application No. PCT/JP2019/039702, dated Dec. 24, 2019, along with English translation thereof.
Office Action dated Jul. 13, 2023 in family member Chinese application No. 201980056741.2 and English language translation thereof.
Office Action dated Aug. 2, 2023 in Taiwanese family member application No. 108140891 with English language translation thereof.

* cited by examiner

SIMULATED MOVING-BED TYPE CHROMATOGRAPHIC SEPARATION METHOD AND SIMULATED MOVING-BED TYPE CHROMATOGRAPHIC SEPARATION SYSTEM

FIELD OF THE INVENTION

The present invention relates to a simulated moving-bed type chromatographic separation method and a simulated moving-bed type chromatographic separation system.

BACKGROUND OF THE INVENTION

In chromatographic separation by a simulated moving-bed scheme, a circulation system is constructed in which a plurality of unit packed columns (hereinafter, also simply referred to as "packed columns", and may be called "columns") packed with an adsorbent having a selective adsorption ability with respect to a specific component of two or more components contained in a feed solution are connected in series via pipes and the packed column at the most downstream portion and the packed column at the most upstream portion are connected in an endless form. A feed solution and an eluent are supplied to this circulation system, a fraction with a fast moving velocity (weakly adsorptive fraction), a fraction with a slow moving velocity (strongly adsorptive fraction), and, if necessary, a fraction with an intermediate moving velocity (intermediately adsorptive fraction) in the circulation system are extracted from different positions, respectively, and then, the feed solution supply position, the eluent supply position, the extraction position of the weakly adsorptive fraction, the extraction position of the intermediately adsorptive fraction, and the extraction position of the strongly adsorptive fraction are shifted toward a fluid circulation direction of the circulation system while maintaining a certain positional relationship. By repeating this operation, treatment operations of the moving bed capable of continuously performing feed solution supply are artificially achieved.

Patent Literature 1 discloses a method of continuously separating three or more fractions differing in affinity for an adsorbent by repeating, to a single improved simulated moving-bed apparatus, a step of extracting an intermediately adsorptive fraction while supplying an eluent and a feed solution and a step of extracting a weakly adsorptive fraction and a strongly adsorptive fraction while supplying an eluent.

In conventionally general chromatographic separation by a simulated moving-bed scheme including the technique described in Patent Literature 1, basically, one kind of eluent is used. Therefore, in a case where a feed solution containing a component having strong adsorptive property with respect to an adsorbent or a feed solution containing a component easily causing tailing (a phenomenon in which concentration distribution becomes broad) is supplied to a circulation system, it is necessary to use a large amount of eluent for desorbing (removing) these components. Using of a large amount of eluent causes an increase in concentration cost of an extraction liquid and also leads to a decrease in production amount of a target purified product per adsorbent.

On the other hand, in chromatographic separation by a simulated moving-bed scheme, using of two or more kinds of eluents has also been reported. For example, Patent Literature 2 describes that a first eluent having weak desorption strength and a second eluent having strong desorption strength are used and a timing for supplying these eluents and a feed solution and a timing for extracting a weakly adsorptive fraction, an intermediately adsorptive fraction, and a strongly adsorptive fraction are set as a specific combination, so that high separation performance is achieved with a small amount of an adsorbent.

CITATION LIST

Patent Literatures

Patent Literature 1: Japanese Patent No. 1998860
Patent Literature 2: Japanese Patent No. 4606092

SUMMARY OF THE INVENTION

Technical Problem

The chromatographic separation of the simulated moving-bed scheme has been also studied on application to medical fields since a target substance to be purified can be continuously obtained at a high purity. For example, in production of antibody drugs, in an extract or culture solution of cultured cells producing antibodies, in addition to target antibodies, fragments, which have been generated by cleavage or the like of antibodies and do not function as antibodies, or aggregates, which are generated by aggregation of antibodies to become enormous, are generated. In general, the fragments have a few interaction sites with the adsorbent and weak adsorptive property with respect to the adsorbent. On the other hand, the aggregates have strong adsorptive property with respect to the adsorbent. Therefore, in the case of applying the chromatographic separation of the simulated moving-bed scheme to purification of antibody drugs, it is necessary to fractionate a target antibody as an intermediately adsorptive fraction showing intermediate adsorptive property with respect to the adsorbent. On the other hand, regarding a weakly adsorptive fraction and a strongly adsorptive fraction, it is necessary to sufficiently remove both of the fractions with a high removal rate.

Furthermore, in the practical use of such chromatographic separation, it is also important that a necessary amount of an adsorbent is reduced as much as possible to enhance separation treatment efficiency, and thereby cost reduction is achieved.

However, the present inventors have conducted studies on chromatographic separation by a conventional simulated moving-bed scheme including the techniques described in respective patent literatures described above, and as a result, have found that the above objects are difficult to sufficiently achieve.

In this regard, the present invention provides a chromatographic separation method using a simulated moving-bed scheme capable of fractionating a purification target component in a feed solution at a high purity with a smaller amount of an adsorbent used.

Furthermore, the present invention also provides a chromatographic separation system suitable for carrying out the above-described chromatographic separation method.

Solution to Problem

The present inventors have conducted intensive studies in view of the above-described problems, and as a result, have found that the above-described problems can be solved by using two or more kinds of eluents and setting a feed solution supply port, a strongly adsorptive fraction extraction port, an intermediately adsorptive fraction extraction port, and a weakly adsorptive fraction extraction port to have a specified positional relationship in a circulation system in a chromatographic separation method using a simulated moving-bed scheme. Studies have been further conducted on the basis of these findings to thereby complete the present invention.

The above-described problems were solved by the following means.

[1]

A simulated moving-bed type chromatographic separation method including separating a weakly adsorptive component, a strongly adsorptive component, and an intermediately adsorptive component that has intermediate adsorptive property in relation to both components, with respect to an adsorbent, with two or more kinds of eluents by using a circulation system in which a plurality of unit packed columns packed with the adsorbent are connected in series and in an endless form via pipes, the weakly adsorptive component, the strongly adsorptive component, and the intermediately adsorptive component being contained in a feed solution, in which a feed solution supply port F, two or more eluent supply ports D corresponding to the two or more kinds of eluents, an extraction port A of a weakly adsorptive fraction containing the weakly adsorptive component, an extraction port B of an intermediately adsorptive fraction containing the intermediately adsorptive component, and an extraction port C of a strongly adsorptive fraction containing the strongly adsorptive component are provided in the pipes of the circulation system, and positions of the feed solution supply port F, the extraction port A, the extraction port B, and the extraction port C are set as described in the following (a) to (c):

(a) the extraction port B is provided on the downstream side of the feed solution supply port F with at least one unit packed column interposed therebetween;

(b) the extraction port C is provided in the pipe having the feed solution supply port F or the extraction port C is provided on the upstream side of the feed solution supply port F with at least one unit packed column interposed therebetween; and (c) the extraction port A is provided in the pipe having the extraction port B or the extraction port A is provided on the downstream side of the extraction port B with at least one unit packed column interposed therebetween, and in which the chromatographic separation method includes sequentially repeating the following steps (A) and (B):

[Step (A)]

a step of simultaneously or separately supplying the feed solution and the two or more kinds of eluents from the feed solution supply port F and the two or more eluent supply ports D, respectively, and simultaneously or separately extracting the weakly adsorptive fraction, the intermediately adsorptive fraction, and the strongly adsorptive fraction from the extraction port A, the extraction port B, and the extraction port C respectively; and

[Step (B)]

a step of shifting the feed solution supply port F, the eluent supply ports D, the extraction port A, the extraction port B, and the extraction port C to the downstream side, while maintaining a relative positional relationship therebetween, after finishing the step (A).

[2]

The simulated moving-bed type chromatographic separation method described in [1], in which the step (A) is configured by a plurality of sub-steps, and the plurality of sub-steps include a sub-step of supplying the feed solution and a sub-step of not supplying the feed solution.

[3]

The simulated moving-bed type chromatographic separation method described in [1] or [2], in which the extraction port C is provided on the downstream side of an eluent supply port D1 supplying an eluent d1 having the strongest desorption strength of the two or more kinds of eluents, at least one unit packed column is arranged between the eluent supply port D1 and the extraction port C, and in the step (A), during the eluent d1 is supplied, the same amount of the strongly adsorptive fraction as the amount of the eluent d1 supplied is extracted from the extraction port C.

[4]

The simulated moving-bed type chromatographic separation method described in any one of [1] to [3], in which the extraction port B is provided on the downstream side of an eluent supply port D2 supplying an eluent d2 having the second strongest desorption strength of the two or more kinds of eluents, at least one unit packed column is arranged between the eluent supply port D2 and the extraction port B, and in the step (A), during the eluent d2 is supplied, a time interval in which the same amount of the intermediately adsorptive fraction as the amount of the eluent d2 supplied is extracted from the extraction port B is provided.

[5]

The simulated moving-bed type chromatographic separation method described in any one of [1] to [4], in which four to six kinds of eluents each having different desorption strength are used.

[6]

The simulated moving-bed type chromatographic separation method described in any one of [1] to [5], in which the circulation system has four or more unit packed columns, the circulation system is divided into four sections 1 to 4 that are annularly continuous from the upstream side to the downstream side such that each section has at least one unit packed column, and the following sub-steps (A1-1), (A2-1), and (A3-1) are performed in the step (A) by using the two or more kinds of eluents:

<Sub-Step (A1-1)> supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying an eluent d-II from an eluent supply port D-II while using an upstream end of the section 2 as the eluent supply port D-II, supplying the feed solution from the feed solution supply port F while using an upstream end of the section 3 as the feed solution supply port F, and extracting the weakly adsorptive fraction from the extraction port A while using a downstream end of the section 4 as the extraction port A, thereby most strengthening desorption strength of the eluent passing through the section 1, weakening desorption strength of the eluent passing through the section 2 more than desorption strength of the eluent passing through the section 1, and weakening desorption strength of the eluent passing through the sections 3 and 4 more than desorption strength of the eluent passing through the section 2;

<Sub-Step (A2-1)> supplying the eluent d-I from the eluent supply port D-I, extracting the strongly adsorptive fraction from the extraction port C, supplying the eluent d-II from the eluent supply port D-II, supplying an eluent d-III from an eluent supply port D-III while using an upstream end of the section 3 as the eluent supply port D-III, and extracting the weakly adsorptive fraction from the extraction port A, thereby most strengthening desorption strength of the eluent passing through the section 1, weakening desorption strength of the eluent passing through the section 2 more than desorption strength of the eluent passing through the section 1, and weakening desorption strength of the eluent passing through the sections 3 and 4 more than desorption strength of the eluent passing through the section 2; and <Sub-Step (A3-1)> supplying the eluent d-I from the eluent supply port D-I, extracting the strongly adsorptive fraction from the extraction port C, supplying the eluent d-II from the eluent supply port D-II, extracting the intermediately adsorptive fraction from the extraction port B while using a downstream end of the section 3 as the extraction port B, supplying an eluent d-IV from an eluent supply port D-IV while using an upstream end of the section 4 as the eluent supply port D-IV, and extracting the weakly adsorptive fraction from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the section 4 more than desorption strength of the eluent passing through the sections 2 and 3.

[7]

The simulated moving-bed type chromatographic separation method described in any one of [1] to [5], in which the circulation system has four or more unit packed columns, the circulation system is divided into four sections 1 to 4 that are annularly continuous from the upstream side to the downstream side such that each section has at least one unit packed column, and the following sub-steps (A1-2), (A2-2), and (A3-2) are performed in the step (A) by using the two or more kinds of eluents:

<Sub-Step (A1-2)> supplying an eluent d-II from an eluent supply port D-II while using an upstream end of the section 1 as the eluent supply port D-II, supplying the feed solution from the feed solution supply port F while using an upstream end of the section 3 as the feed solution supply port F, and extracting the weakly adsorptive fraction from the extraction port A while using a downstream end of the section 4 as the extraction port A, thereby most strengthening desorption strength of the eluent passing through the sections 1 and 2, and weakening desorption strength of the eluent passing through the sections 3 and 4 more than desorption strength of the eluent passing through the sections 1 and 2;

<Sub-Step (A2-2)> supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying the eluent d-II from the eluent supply port D-II while using an upstream end of the section 2 as the eluent supply port D-II, supplying an eluent d-III from an eluent supply port D-III while using an upstream end of the section 3 as the eluent supply port D-III, and extracting the weakly adsorptive fraction from the extraction port A, thereby most strengthening desorption strength of the eluent passing through the section 1, weakening desorption strength of the eluent passing through the section 2 more than desorption strength of the eluent passing through the section 1, and weakening desorption strength of the eluent passing through the sections 3 and 4 more than desorption strength of the eluent passing through the section 2; and <Sub-Step (A3-2)> supplying the eluent d-I from the eluent supply port D-I, extracting the strongly adsorptive fraction from the extraction port C, supplying the eluent d-II from the eluent supply port D-II in the sub-step (A2-2), extracting the intermediately adsorptive fraction from the extraction port B while using a downstream end of the section 3 as the extraction port B, supplying an eluent d-IV from an eluent supply port D-IV while using an upstream end of the section 4 as the eluent supply port D-IV, and extracting the weakly adsorptive fraction from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the section 4 more than desorption strength of the eluent passing through the sections 2 and 3.

[8]

The simulated moving-bed type chromatographic separation method described in any one of [1] to [5], in which the circulation system has five or more unit packed columns, the circulation system is divided into five sections 1 to 5 that are annularly continuous from the upstream side to the downstream side such that each section has at least one unit packed column, and the following sub-steps (A1-3), (A2-3), and (A3-3) are performed in the step (A) by using the two or more kinds of eluents:

<Sub-Step (A1-3)> supplying an eluent d-II from an eluent supply port D-II while using an upstream end of the section 1 as the eluent supply port D-II, supplying the feed solution from the feed solution supply port F while using an upstream end of the section 3 as the feed solution supply port F, supplying an eluent d-III from an eluent supply port D-III while using an upstream end of the section 4 as the eluent supply port D-III, and extracting the weakly adsorptive fraction from the extraction port A while using a downstream end of the section 5 as the extraction port A, thereby most strengthening desorption strength of the eluent passing through the sections 1 and 2, setting desorption strength of the eluent passing through the section 3 to be equal to desorption strength of the eluent passing through the sections 1 and 2 or weakening desorption strength of the eluent passing through the section 3 more than desorption strength of the eluent passing through the sections 1 and 2, and weakening desorption strength of the eluent passing through the sections 4 and 5 more than desorption strength of the eluent passing through the section 3; and <Sub-Step (A2-3)> supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying the eluent d-II from the eluent supply port D-II while using an upstream end of the section 2 as the eluent supply port D-II, supplying the eluent d-III from the eluent supply port D-III, and extracting the weakly adsorptive fraction from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3; and <Sub-Step (A3-3)> supplying the eluent d-I from the eluent supply port D-I, extracting the strongly adsorptive fraction from the extraction port C, supplying the eluent d-II from the eluent supply port D-II in the sub-step (A2-3), extracting the intermediately adsorptive fraction from the extraction port B while using a downstream end of the section 4 as the extraction port B, supplying an eluent d-IV from an eluent supply port D-IV while using an upstream end of the section 5 as the eluent supply port D-IV, and extracting the weakly adsorptive fraction from the extraction port A, thereby most strengthening desorption strength of the eluent passing through the section 1, weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

[9]

The simulated moving-bed type chromatographic separation method described in any one of [1] to [5], in which the circulation system has seven or more unit packed columns, the circulation system is divided into five sections 1 to 5 that are annularly continuous from the upstream side to the downstream side such that each section has at least one unit packed column, and the following sub-steps (A1-4), (A2-4), and (A3-4) are performed in the step (A) by using the two or more kinds of eluents:

<Sub-Step (A1-4)> supplying an eluent d-II from an eluent supply port D-II while using an upstream end of the section 1 as the eluent supply port D-II, supplying the feed solution from the feed solution supply port F while using an upstream end of the section 3 as the feed solution supply port F, supplying an eluent d-III from an eluent supply port D-III while using an upstream end of the section 4 as the eluent supply port D-III, and extracting the weakly adsorptive fraction from the extraction port A while using a downstream end of the section 5 as the extraction port A, thereby most strengthening desorption strength of the eluent passing through the sections 1 and 2, setting desorption strength of the eluent passing through the section 3 to be equal to desorption strength of the eluent passing through the sections 1 and 2 or weakening desorption strength of the eluent passing through the section 3 more than desorption strength of the eluent passing through the sections 1 and 2, and weakening desorption strength of the eluent passing through the sections 4 and 5 more than desorption strength of the eluent passing through the section 3; and <Sub-Step (A2-4)> supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying the eluent d-II from the eluent supply port D-II while using an upstream end of the section 2 as the eluent supply port D-II, supplying an eluent d-IV from an eluent supply port D-IV while using an upstream end of the section 4 as the eluent supply port D-IV, and extracting the weakly adsorptive fraction from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3; and <Sub-Step (A3-4)> supplying the eluent d-I from the eluent supply port D-I, extracting the strongly adsorptive fraction from the extraction port C, supplying the eluent d2 from the eluent supply port D2 in the sub-step (A2-4), extracting the intermediately adsorptive fraction from the extraction port B while using a downstream end of the section 4 as the extraction port B, supplying an eluent d-V from an eluent supply port D-V while using an upstream end of the section 5 as the eluent supply port D-V, and extracting the weakly adsorptive fraction from the extraction port A, thereby most strengthening desorption strength of the eluent passing through the section 1, weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

[10]

The simulated moving-bed type chromatographic separation method described in any one of [1] to [5], in which the circulation system has five or more unit packed columns, the circulation system is divided into five sections 1 to 5 that are annularly continuous from the upstream side to the downstream side such that each section has at least one unit packed column, and the following sub-steps (A1-5), (A2-5), and (A3-5) are performed in the step (A) by using the two or more kinds of eluents:

<Sub-Step (A1-5)> supplying the feed solution from the feed solution supply port F while using an upstream end of the section 3 as the feed solution supply port F, supplying an eluent d-III from an eluent supply port D-III while using an upstream end of the section 4 as the eluent supply port D-III, and extracting the weakly adsorptive fraction from the extraction port A while using a downstream end of the section 5 as the extraction port A, thereby most strengthening desorption strength of the eluent passing through the section 3, and weakening desorption strength of the eluent passing through the sections 4 and 5 more than desorption strength of the eluent passing through the section 3;

<Sub-Step (A2-5)> supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying an eluent d-II from an eluent supply port D-II while using an upstream end of the section 2 as the eluent supply port D-II, supplying the eluent d-III from the eluent supply port D-III, and extracting the weakly adsorptive fraction from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3; and <Sub-Step (A3-5)> supplying the eluent d-I from the eluent supply port D-I, extracting the strongly adsorptive fraction from the extraction port C, supplying the eluent d-II from the eluent supply port D-II, extracting the intermediately adsorptive fraction from the extraction port B while using a downstream end of the section 4 as the extraction port B, supplying an eluent d-IV from an eluent supply port D-IV while using an upstream end of the section 5 as the eluent supply port D-IV, and extracting the weakly adsorptive fraction from the extraction port A, thereby most strengthening desorption strength of the eluent passing through the section 1, weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

[11]

The simulated moving-bed type chromatographic separation method described in any one of [1] to [5], in which the circulation system has five or more unit packed columns, the circulation system is divided into five sections 1 to 5 that are annularly continuous from the upstream side to the downstream side such that each section has at least one unit packed column, and the following sub-steps (A1-6), (A2-6), and (A3-6) are performed in the step (A) by using the two or more kinds of eluents:

<Sub-Step (A1-6)> supplying an eluent d-II from an eluent supply port D-II while using an upstream end of the section 1 as the eluent supply port D-II, extracting the intermediately adsorptive fraction from the extraction port B while using a downstream end of the section 3 as the extraction port B, supplying an eluent d-IV from an eluent supply port D-IV while using an upstream end of the section 4 as the eluent supply port D-IV, and extracting the weakly adsorptive fraction from the extraction port A while using a downstream end of the section 5 as the extraction port A, thereby most strengthening desorption strength of the eluent passing through the sections 1, 2, and 3, and weakening desorption strength of the eluent passing through the sections 3 and 5 more than desorption strength of the eluent passing through the sections 1, 2, and 3;

<Sub-Step (A2-6)> supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying the feed solution from the feed solution supply port F while using an upstream end of the section 3 as the feed solution supply port F, supplying an eluent d-III from an eluent supply port D-III while using an upstream end of the section 4 as the eluent supply port D-III, and extracting the weakly adsorptive fraction from the extraction port A, thereby most strengthening desorption strength of the eluent passing through the section 1, weakening desorption strength of the eluent passing through the section 3 more than desorption strength of the eluent passing through the section 1, and weakening desorption strength of the eluent passing through the sections 4 and 5 more than desorption strength of the eluent passing through the section 3; and <Sub-Step (A3-6)> supplying the eluent d-I from the eluent supply port D-I, extracting the strongly adsorptive fraction from the extraction port C, supplying the eluent d-II from the eluent supply port D-II while using an upstream end of the section 2 as the eluent supply port D-II, supplying the eluent d-III from the eluent supply port D-III, and extracting the weakly adsorptive fraction from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3.

[12]

The simulated moving-bed type chromatographic separation method described in any one of [1] to [5], in which the circulation system has five or more unit packed columns, the circulation system is divided into five sections 1 to 5 that are annularly continuous from the upstream side to the downstream side such that each section has at least one unit packed column, and the following sub-steps (A1-7), (A2-7), and (A3-7) are performed in the step (A) by using the two or more kinds of eluents:

<Sub-Step (A1-7)> supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying the feed solution from the feed solution supply port F while using an upstream end of the section 3 as the feed solution supply port F, supplying an eluent d-III from an eluent supply port D-III while using an upstream end of the section 4 as the eluent supply port D-III, and extracting the weakly adsorptive fraction from the extraction port A while using a downstream end of the section 5 as the extraction port A, thereby most strengthening desorption strength of the eluent passing through the section 1, weakening desorption strength of the eluent passing through the section 3 more than desorption strength of the eluent passing through the section 1, and weakening desorption strength of the eluent passing through the sections 4 and 5 more than desorption strength of the eluent passing through the section 3;

<Sub-Step (A2-7)> supplying the eluent d-I from the eluent supply port D-I, extracting the strongly adsorptive fraction from the extraction port C, supplying an eluent d-II from an eluent supply port D-II while using an upstream end of the section 2 as the eluent supply port D-II, supplying the eluent d-III from the eluent supply port D-III, and extracting the weakly adsorptive fraction from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3; and <Sub-Step (A3-7)> supplying the eluent d-I from the eluent supply port D-I, extracting the strongly adsorptive fraction from the extraction port C, supplying the eluent d-II from the eluent supply port D-II, extracting the intermediately adsorptive fraction from the extraction port B while using a downstream end of the section 4 as the extraction port B, supplying an eluent d-IV from an eluent supply port D-IV while using an upstream end of the section 5 as the eluent supply port D-IV, and extracting the weakly adsorptive fraction from the extraction port A, thereby most strengthening desorption strength of the eluent passing through the section 1, weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

[13]

A simulated moving-bed type chromatographic separation system separating a weakly adsorptive component, a strongly adsorptive component, and an intermediately adsorptive component that has intermediate adsorptive property in relation to both components, with respect to an adsorbent, with two or more kinds of eluents by using a circulation system in which a plurality of unit packed columns packed with the adsorbent are connected in series and in an endless form via pipes, the weakly adsorptive component, the strongly adsorptive component, and the intermediately adsorptive component being contained in a feed solution, in which a feed solution supply port F, two or more eluent supply ports D corresponding to the two or more kinds of eluents, an extraction port A of a weakly adsorptive fraction containing the weakly adsorptive component, an extraction port B of an intermediately adsorptive fraction containing the intermediately adsorptive component, and an extraction port C of a strongly adsorptive fraction containing the strongly adsorptive component are provided in the pipes of the circulation system, and positions of the feed solution supply port F, the extraction port A, the extraction port B, and the extraction port C are set as described in the following (a) to (c):

(a) the extraction port B is provided on the downstream side of the feed solution supply port F with at least one unit packed column interposed therebetween;

(b) the extraction port C is provided in the pipe having the feed solution supply port F or the extraction port C is provided on the upstream side of the feed solution supply port F with at least one unit packed column interposed therebetween; and (c) the extraction port A is provided in the pipe having the extraction port B or the extraction port A is provided on the downstream side of the extraction port B with at least one unit packed column interposed therebetween, and in which the chromatographic separation system has a means for sequentially repeating the following steps (A) and (B):

[Step (A)]

a step of simultaneously or separately supplying the feed solution and the two or more kinds of eluents from the feed solution supply port F and the two or more eluent supply ports D respectively, and simultaneously or separately extracting the weakly adsorptive fraction, the intermediately adsorptive fraction, and the strongly adsorptive fraction from the extraction port A, the extraction port B, and the extraction port C respectively; and

[Step (B)]

a step of shifting the feed solution supply port F, the eluent supply ports D, the extraction port A, the extraction port B, and the extraction port C to the downstream side, while maintaining a relative positional relationship therebetween, after finishing the step (A).

In the present specification, the terms "upstream" and "downstream" are used with respect to a flow direction of a fluid in the circulation system. That is, the term "upstream side" with respect to a certain part in the circulation system means a side at which the fluid flows toward the part, and the term "downstream side" means a side at which the fluid flows out from the part.

In the present specification, the term "strongly adsorptive component" means a component having strong adsorption force with respect to an adsorbent of a plurality of components contained in a feed solution, the term "weakly adsorptive component" means a component having weak adsorption force with respect to the adsorbent of the plurality of components contained in the feed solution, and the term "intermediately adsorptive component" means a component having weaker adsorption force with respect to the adsorbent than the strongly adsorptive component and having stronger adsorption force with respect to the adsorbent than the weakly adsorptive component. That is, the terms "strongly adsorptive", "intermediately adsorptive", and "weakly adsorptive" indicate the relative strength of adsorption force when comparing adsorption force of each component contained in the feed solution with respect to the adsorbent.

The above-described "strongly adsorptive component", "intermediately adsorptive component", and "weakly adsorptive component" may be composed of single component, respectively. Furthermore, the plurality of components may have the same or different adsorption force.

Grouping of respective components in the feed solution into the "strongly adsorptive component", the "intermediately adsorptive component", and the "weakly adsorptive component" can be appropriately set depending on purposes. When a case where the feed solution contains four kinds of components is used as an example, two kinds of components in descending order according to adsorption force with respect to the adsorbent can be collectively regarded as the strongly adsorptive component, a component having the third strongest adsorption force with respect to the adsorbent can be regarded as the intermediately adsorptive component, and a component having the weakest adsorption force with respect to the adsorbent can be regarded as the weakly adsorptive component. Furthermore, a component having the strongest adsorption force with respect to the adsorbent can also be regarded as the strongly adsorptive component, a component having the second strongest adsorption force and a component having the third strongest adsorption force with respect to the adsorbent can also be collectively regarded as the intermediately adsorptive component, and a component having the weakest adsorption force with respect to the adsorbent can also be regarded as the weakly adsorptive component. Furthermore, a component having the strongest adsorption force with respect to the adsorbent can also be regarded as the strongly adsorptive component, a component having the second strongest adsorption force with respect to the adsorbent can also be regarded as the intermediately adsorptive component, and a component having the third strongest adsorption force with respect to the adsorbent and a component having the weakest adsorption force with respect to the adsorbent can also be collectively regarded as the weakly adsorptive component. Also in a case where the feed solution contains five or more kinds of components, similarly, separation and purification based on various groupings can be performed.

In the present invention, the term "desorption strength" of the eluent means a strength of effect of desorbing a component adsorbed to an adsorbent from the adsorbent.

Advantageous Effects of Invention

According to the simulated moving-bed type chromatographic separation method of the present invention, a purification target component in a feed solution can be fractionated at a high purity while the amount of an adsorbent used is suppressed. Furthermore, the simulated moving-bed type chromatographic separation system of the present invention can be suitably used for carrying out the simulated moving-bed type chromatographic separation method of the present invention.

DESCRIPTION OF EMBODIMENTS

Preferred embodiments of a simulated moving-bed type chromatographic separation method of the present invention (hereinafter, also simply referred to as the "method of the present invention") will be described.

The method of the present invention is carried out by using a circulation system in which a plurality of unit packed columns packed with an adsorbent are connected in series and in an endless form via pipes. The circulation system itself used in the simulated moving-bed scheme is publicly known, and for example, JP-A-2009-36536 ("JP-A" means an unexamined published Japanese patent application), Japanese Patent No. 4606092 B2, and the like can be referred to.

The circulation system will be described below using the drawings; however, the present invention is not limited to these embodiments, except for the requirements defined by the present invention.

Incidentally, the drawings described below are explanatory diagrams for facilitating understanding of the present invention, and regarding sizes and relative magnitude relationships of respective configurations, the large one or the small one is sometimes changed for the purpose of illustration, and the form does not show a real relation as it is. Furthermore, the present invention is not limited to shapes, relative positional relationships, and the like illustrated in these drawings, except for the requirements defined by the present invention.

Furthermore, conditions other than the requirements defined by the present invention, such as the capacity of a unit packed column, intratubular cross-sectional areas and lengths of pipes, and a flow velocity of a liquid to be supplied to the circulation system, can be appropriately set depending on purposes.

Figure 1:
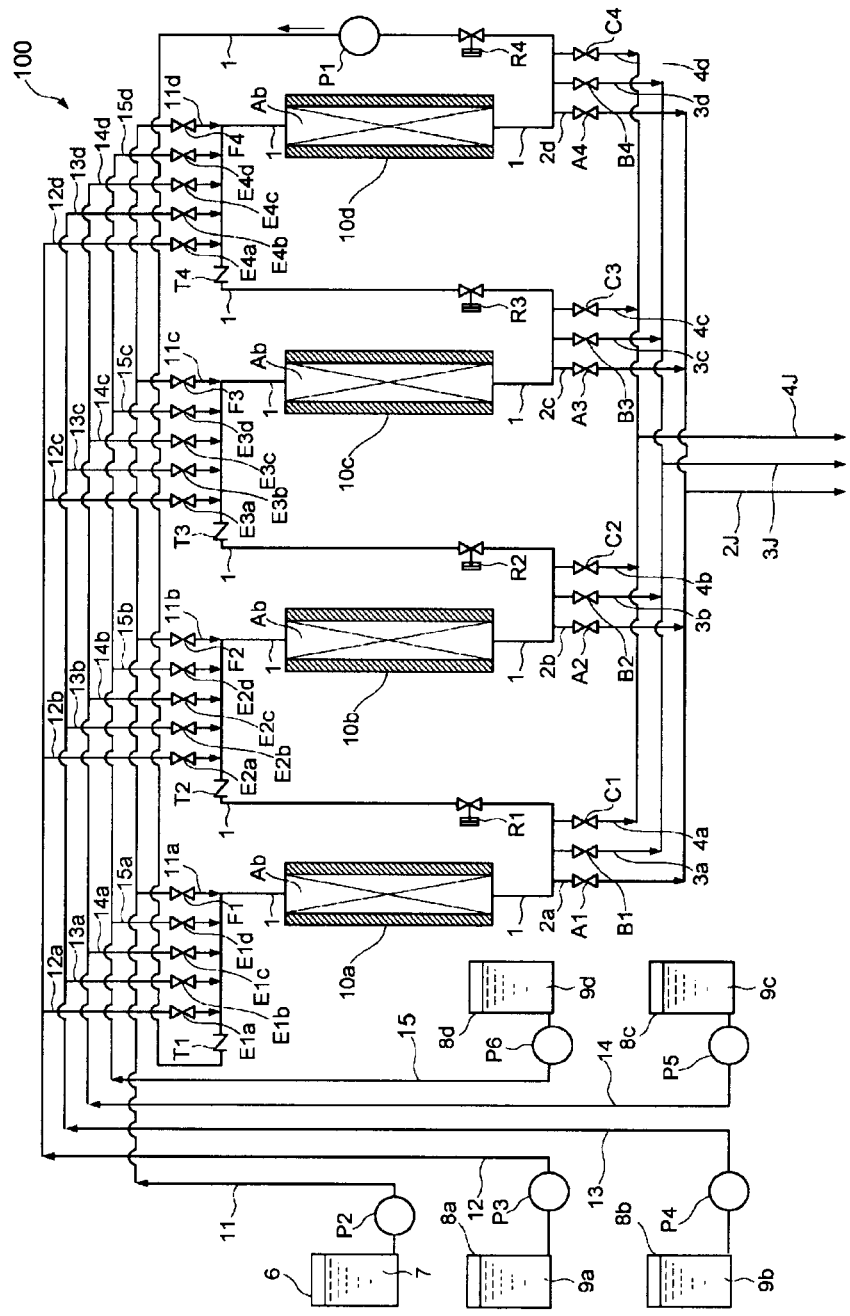
FIG. 1 is a system diagram illustrating an example of a simulated moving-bed type chromatographic separation system of the present invention.

A preferred embodiment of a circulation system used in the method of the present invention is illustrated in FIG. 1. A circulation system 100 illustrated in FIG. 1 includes four unit packed columns (columns) (unit packed columns 10a, 10b, 10c, and 10d) packed with an adsorbent Ab, an exit of each unit packed column is connected to an entrance of an adjacent unit packed column via a pipe 1, and respective unit packed columns are connected in series as a whole.

Further, all of the unit packed columns are connected in an endless form (in an annular form) by connecting the exit of a most downstream-side unit packed column (for example, the unit packed column 10*d*) to the entrance of a most upstream-side unit packed column (for example, the unit packed column 10*a*) via the pipe 1. With such a configuration, a fluid can be circulated in the circulation system 100. The unit packed columns 10*a* to 10*d* may be the same as or different from each other in the inner shape, the size, and the amount of the adsorbent packed. It is preferable to use the unit packed columns 10*a* to 10*d* of which the inner shape, size, and the amount of the adsorbent packed are all equivalent (preferably are the same).

A circulation pump P1 for allowing a fluid to flow in an arrow direction can be arranged in the circulation system 100. The circulation pump P1 is preferably a metering pump. Furthermore, in the circulation system 100, shutoff valves R1, R2, R3, and R4 capable of shutting off the circulation of the fluid to the unit packed column on the downstream side of the pipe 1 are provided in the pipe 1 between two adjacent unit packed columns.

Weakly adsorptive fraction extracting lines 2*a*, 2*b*, 2*c*, and 2*d* for extracting a fraction containing much weakly adsorptive components with respect to the adsorbent Ab (referred to as "weakly adsorptive fraction with respect to the adsorbent Ab" or simply referred to as "weakly adsorptive fraction" in the present specification) are divergently arranged between the respective shutoff valves R1 to R4 and the exits of the respective unit packed columns 10*a* to 10*d* positioned at the upstream sides thereof, respectively. Weakly adsorptive fraction extracting valves A1, A2, A3, and A4 capable of opening and closing the respective weakly adsorptive fraction extracting lines are provided in the respective weakly adsorptive fraction extracting lines 2*a*, 2*b*, 2*c*, and 2*d*, respectively. The respective weakly adsorptive fraction extracting lines 2*a*, 2*b*, 2*c*, and 2*d* are joined into a single weakly adsorptive fraction joining pipe 2J.

Furthermore, similarly, intermediately adsorptive fraction extracting lines 3*a*, 3*b*, 3*c*, and 3*d* for extracting a fraction containing much intermediately adsorptive components with respect to the adsorbent Ab (referred to as "intermediately adsorptive fraction with respect to the adsorbent Ab" or simply referred to as "intermediately adsorptive fraction" in the present specification) are divergently arranged between the respective shutoff valves R1 to R4 and the exits of the respective unit packed columns 10*a* to 10*d* positioned at the upstream sides thereof. Intermediately adsorptive fraction extracting valves B1, B2, B3, and B4 capable of opening and closing the respective intermediately adsorptive fraction extracting lines are provided in the respective intermediately adsorptive fraction extracting lines 3*a*, 3*b*, 3*c*, and 3*d*, respectively. The respective intermediately adsorptive fraction extracting lines 3*a*, 3*b*, 3*c*, and 3*d* are joined into a single intermediately adsorptive fraction joining pipe 3J.

Furthermore, similarly, strongly adsorptive fraction extracting lines 4*a*, 4*b*, 4*c*, and 4*d* for extracting a fraction containing much strongly adsorptive components with respect to the adsorbent Ab (referred to as "strongly adsorptive fraction with respect to the adsorbent Ab" or simply referred to as "strongly adsorptive fraction" in the present specification) are divergently arranged between the respective shutoff valves R1 to R4 and the exits of the respective unit packed columns 10*a* to 10*d* positioned at the upstream sides thereof. Strongly adsorptive fraction extracting valves C1, C2, C3, and C4 capable of opening and closing the respective strongly adsorptive fraction extracting lines are provided in the respective strongly adsorptive fraction extracting lines 4*a*, 4*b*, 4*c*, and 4*d*, respectively. The respective strongly adsorptive fraction extracting lines 4*a*, 4*b*, 4*c*, and 4*d* are joined into a single strongly adsorptive fraction joining pipe 4J.

In a step (A) described below, some of the weakly adsorptive fraction extracting valves A1, A2, A3, and A4 is in a state of being opened. A connection part between the weakly adsorptive fraction extracting line in which the opened weakly adsorptive fraction extracting valve is provided and the pipe 1 becomes an extraction port A of a weakly adsorptive fraction in the step (A) described below.

Furthermore, in the step (A) described below, some of the intermediately adsorptive fraction extracting valves B1, B2, B3, and B4 is in a state of being opened. A connection part between the intermediately adsorptive fraction extracting line in which the opened intermediately adsorptive fraction extracting valve is provided and the pipe 1 becomes an extraction port B of an intermediately adsorptive fraction in the step (A) described below.

Furthermore, in the step (A) described below, some of the strongly adsorptive fraction extracting valves C1, C2, C3, and C4 is in a state of being opened. A connection part between the strongly adsorptive fraction extracting line in which the opened strongly adsorptive fraction extracting valve is provided and the pipe 1 becomes an extraction port C of a strongly adsorptive fraction in the step (A) described below.

A safety valve (or a relief valve) (not illustrated) can be provided in an appropriate part in the circulation system 100 in order to prevent the pressure of the circulation system 100 from being excessively increased. Furthermore, check valves T1, T2, T3, and T4 for backflow prevention are preferably provided between two adjacent unit packed columns.

As illustrated in FIG. 1, the inside of the circulation system 100 is configured to capable of supplying a feed solution 7 housed in a feed solution tank 6. Further, the inside of the circulation system 100 is configured to capable of supplying two or more kinds of eluents. In FIG. 1, as an example, an embodiment in which four kinds of eluents are supplied is illustrated.

The feed solution 7 is supplied by a feed solution supply pump P2 capable of controlling the supply flow rate via a feed solution supplying line 11. The feed solution supply pump P2 is preferably a metering pump. The feed solution supplying line 11 is diverged into four divergent feed solution supplying lines 11*a*, 11*b*, 11*c*, and 11*d* as illustrated in FIG. 1, and is configured to capable of supplying the feed solution to the entrances of the respective unit packed columns 10*a*, 10*b*, 10*c*, and 10*d* via the respective divergent feed solution supplying lines 11*a*, 11*b*, 11*c*, and 11*d*. Feed solution supplying valves F1, F2, F3, and F4 capable of being opened/closed are provided in the respective divergent feed solution supplying lines 11*a*, 11*b*, 11*c*, and 11*d*, and the feed solution is supplied through a divergent feed solution supplying line having an opened feed solution supplying valve to a unit packed column connected to the downstream thereof.

In the step (A) described below, some of the feed solution supplying valves F1, F2, F3, and F4 is in a state of being opened. A connection part between the divergent feed solution supplying line in which the opened feed solution supplying valve is provided and the pipe 1 becomes a feed solution supply port F in the step (A) described below.

FIG. 1 illustrates an embodiment in which four kinds of eluents each having different desorption strength are supplied. An eluent 9a housed in an eluent tank 8a is supplied to an eluent supplying line 12 by an eluent supply pump P3 capable of controlling the supply flow rate. An eluent 9b housed in an eluent tank 8b is supplied to an eluent supplying line 13 by an eluent supply pump P4 capable of controlling the supply flow rate. An eluent 9c housed in an eluent tank 8c is supplied to an eluent supplying line 14 by an eluent supply pump P5 capable of controlling the supply flow rate. Further, an eluent 9d housed in an eluent tank 8d is supplied to an eluent supplying line 15 by an eluent supply pump P6 capable of controlling the supply flow rate.

The eluent supply pumps P3 to P6 are preferably a metering pump. The eluent supplying line 12 is diverged into four divergent eluent supplying lines 12a, 12b, 12c, and 12d as illustrated in FIG. 1, and is configured to capable of supplying the eluents to the entrances of the respective unit packed columns 10a, 10b, 10c, and 10d via the respective divergent eluent supplying lines 12a, 12b, 12c, and 12d. Eluent supplying valves E1a, E2a, E3a, and E4a capable of being opened/closed are provided in the respective divergent eluent supplying lines 12a, 12b, 12c, and 12d, and the eluent is supplied through a divergent eluent supplying line having an opened eluent supplying valve to a unit packed column connected to the downstream thereof.

Similarly, the eluent supplying line 13 is diverged into four divergent eluent supplying lines 13a, 13b, 13c, and 13d, the eluent supplying line 14 is diverged into four divergent eluent supplying lines 14a, 14b, 14c, and 14d, the eluent supplying line 15 is diverged into four divergent eluent supplying lines 15a, 15b, 15c, and 15d, and each eluent supplying line is configured to capable of supplying each eluent to the entrances of the respective unit packed columns 10a, 10b, 10c, and 10d.

Eluent supplying valves E1b, E2b, E3b, and E4b capable of being opened/closed are provided in the divergent eluent supplying lines 13a, 13b, 13c, 13d, eluent supplying valves E1c, E2c, E3c, and E4c capable of being opened/closed are provided in the divergent eluent supplying lines 14a, 14b, 14c, and 14d, and eluent supplying valves E1d, E2d, E3d, and E4d capable of being opened/closed are provided in the divergent eluent supplying lines 15a, 15b, 15c, and 15d, respectively.

In the step (A) described below, a connection part between the divergent eluent supplying line in which the opened eluent supplying valve is provided and the pipe 1 becomes an eluent supply port D. In the method of the present invention, since two or more kinds of eluents are used, in the step (A) described below, there are a plurality of eluent supplying valves to be opened. Therefore, in the step (A) described below, the eluent supply port D exists by the number (two or more) corresponding to the kinds of eluent to be used.

Subsequently, the operation of the circulation system when the method of the present invention is carried out by the circulation system will be described; however, the present invention is not limited to these embodiments, except for the requirements defined by the present invention.

In the method of the present invention, the circulation system is set such that positions of the feed solution supply port F, the extraction port A of a weakly adsorptive fraction, the extraction port B of an intermediately adsorptive fraction, and the extraction port C of a strongly adsorptive fraction have relationship satisfying the following (a) to (c). That is, in repetition of steps (A) and (B) described below, the relative positional relationship between the feed solution supply port F, the extraction port A of a weakly adsorptive fraction, the extraction port B of an intermediately adsorptive fraction, and the extraction port C of a strongly adsorptive fraction satisfies (a) to (c) at all times.

(a) The intermediately adsorptive fraction extraction port B is provided on the downstream side of the feed solution supply port F with at least one unit packed column interposed therebetween.

(b) The strongly adsorptive fraction extraction port C is provided in the pipe having the feed solution supply port F or the strongly adsorptive fraction extraction port C is provided on the upstream side of the feed solution supply port F with at least one unit packed column interposed therebetween.

Herein, the expression "the strongly adsorptive fraction extraction port C is provided in the pipe having the feed solution supply port F" means that any unit packed column is not arranged between the strongly adsorptive fraction extraction port C and the feed solution supply port F.

Furthermore, in a case where "the strongly adsorptive fraction extraction port C is provided in the pipe having the feed solution supply port F", the strongly adsorptive fraction extraction port C is provided upstream in the same pipe than the feed solution supply port F. This is applicable to all of the relationships between the extraction ports and the supply ports provided in the same pipes. That is, in the circulation system, in a certain extraction port and a certain supply port are provided in the same pipe (in a case where an extraction port and a supply port are provided without a unit packed column interposed therebetween), the extraction port is provided upstream in the same pipe than the supply port. This is to prevent the supplied liquid from being extracted from the extraction port before the liquid reaches the unit packed column on the downstream thereof.

The above (b) is preferably an embodiment in which the strongly adsorptive fraction extraction port C is provided on the upstream side of the feed solution supply port F with at least one unit packed column interposed therebetween.

(c) The weakly adsorptive fraction extraction port A is provided in the pipe having the intermediately adsorptive fraction extraction port B or the weakly adsorptive fraction extraction port A is provided on the downstream side of the intermediately adsorptive fraction extraction port B with at least one unit packed column interposed therebetween.

Herein, the expression "the weakly adsorptive fraction extraction port A is provided in the pipe having the intermediately adsorptive fraction extraction port B" means that any unit packed column is not arranged between the weakly adsorptive fraction extraction port A and the intermediately adsorptive fraction extraction port B.

The above (c) is preferably an embodiment in which the weakly adsorptive fraction extraction port A is provided on the downstream side of the intermediately adsorptive fraction extraction port B with at least one unit packed column interposed therebetween.

In the method of the present invention, the following steps (A) and (B) are sequentially repeated by using the circulation system.

[Step (A)]

Step of simultaneously or separately supplying the feed solution and the two or more kinds of eluents from the feed solution supply port F and the two or more eluent supply ports D respectively, and simultaneously or separately extracting a weakly adsorptive fraction, an intermediately adsorptive fraction, and a strongly adsorptive fraction from the weakly adsorptive fraction extraction port A, the intermediately adsorptive fraction extraction port B, and the strongly adsorptive fraction extraction port C respectively.

Herein, in the step (A), the total of the amount of the feed solution supplied from the feed solution supply port F and the amount of the eluent supplied from the eluent supply port D coincides with the total of the amount of the weakly adsorptive fraction extracted from the weakly adsorptive fraction extraction port A, the amount of the intermediately adsorptive fraction extracted from the intermediately adsorptive fraction extraction port B, and the amount of the strongly adsorptive fraction C extracted from the strongly adsorptive fraction extraction port C. That is, in a state where the liquid is supplied into the circulation system, the same amount of the liquid as the amount of the liquid supplied is extracted from the inside of the circulation system.

More specifically, in a case where a liquid is supplied from a certain supply port (X) and the liquid is extracted from an extraction port (Y) on the downstream side thereof, when the liquid is not supplied from the downstream side of X and the upstream side of Y, the amount of the liquid extracted from Y is the same as the amount of the liquid supplied from X. Furthermore, when the liquid is supplied from the downstream side of X and the upstream side of Y, the amount of the liquid extracted from Y is the same as the total of the amount of the liquid supplied from X and the amount of the liquid supplied from the downstream side of X and the upstream side of Y. For example, in the sub-step (A1-1) of FIG. 2, the supplied amount of the eluent supplied from the eluent supply port D1 is the same as the extracted amount of the strongly adsorptive fraction extracted from the strongly adsorptive fraction extraction port C. Furthermore, similarly, in the sub-step (A1-1), the total of the supplied amount of the eluent supplied from the eluent supply port D2 and the supplied amount of the feed solution supplied from the feed solution supply port F is the same as the amount of the weakly adsorptive fraction extracted from the weakly adsorptive fraction extraction port A.

Furthermore, the expression "simultaneously or separately supplying" means that a liquid is supplied without time differences (without delaying of the supply timing) or is supplied with time differences (with delaying of the supply timing). However, in one step (A), in a case where two or more supply ports supplying two or more kinds of liquids are arranged in the same pipe (in a case where two or more supply ports are arranged in the pipe without a unit packed column interposed therebetween, and different liquids are supplied from each of the two or more supply ports), the supplies of the two or more kinds of liquids are not simultaneously performed. That is, in one step (A), the supplies of the two or more kinds of liquids are performed as different sub-steps. Similarly, in one step (A), in a case where two or more extraction ports extracting two or more kinds of fractions are arranged in the same pipe (in a case where two or more extraction ports are arranged in the pipe without a unit packed column interposed therebetween, and different fractions are extracted from each of the two or more extraction ports), the extractions of the two or more kinds of fractions are not simultaneously performed. That is, in one step (A), the extractions of the two or more kinds of fractions are performed as different sub-steps.

[Step (B)]

Step of shifting the feed solution supply port F, the eluent supply ports D, the weakly adsorptive fraction extraction port A, the intermediately adsorptive fraction extraction port B, and the strongly adsorptive fraction extraction port C to the downstream side, while maintaining a relative positional relationship therebetween, after finishing the step (A).

This shifting to the downstream side means that the feed solution supply port F, the eluent supply ports D, the weakly adsorptive fraction extraction port A, the intermediately adsorptive fraction extraction port B, and the strongly adsorptive fraction extraction port C are shifted by one unit packed column to the downstream side while the relative positional relationship therebetween is maintained.

For example, in the step (A), in a case where a connection part between the divergent feed solution supplying line in which the feed solution supplying valve F1 is provided and the pipe 1 is the feed solution supply port F, this feed solution supply port F is shifted to a connection part between the divergent feed solution supplying line in which the feed solution supply valve F2 is provided and the pipe 1 by the step (B). The same applies to the eluent supply port D, the weakly adsorptive fraction extraction port A, the intermediately adsorptive fraction extraction port B, and the strongly adsorptive fraction extraction port C. Furthermore, shifting of each supply port and each extraction port to the downstream side by one unit packed column can be performed by regulating opening/closing various pumps or various valves arranged in the circulation system.

As a result of carrying out the step (B), in the subsequent step (A) (referred to as the step (A2)), supply and extraction of a liquid are performed with respect to each unit packed column on the downstream side than the step (A1) by one unit packed column. The supply and extraction of a liquid are performed similarly to the case where supply and extraction of a liquid are performed with respect to each unit packed column in the step (A) (referred to as the step (A1)) immediately before the step (B).

The step (A) is preferably configured by a plurality of sub-steps. In this case, it is possible to appropriately arrange in which sub-steps the feed solution from the feed solution supply port F is supplied, each eluent of two or more kinds of eluents from the two or more eluent supply ports D is supplied, the weakly adsorptive fraction from the weakly adsorptive fraction extraction port A is extracted, the intermediately adsorptive fraction from the intermediately adsorptive fraction extraction port B is extracted, and the strongly adsorptive fraction from the strongly adsorptive fraction extraction port C is extracted, depending on purposes and in the range that the effects of the present invention are not impaired.

In particular, in the method of the present invention, the step (A) preferably includes a sub-step of supplying a feed solution and a sub-step of not supplying a feed solution. That is, it is preferable that there are a time at which a feed solution is supplied and a time at which a feed solution is not supplied in the step (A).

In the step (A), two or more kinds of eluents are supplied. A supply port of an eluent having the strongest desorption strength of these two or more kinds of eluents is preferably provided in a pipe on the upstream side with respect to the strongly adsorptive fraction extraction port C with the unit packed column interposed therebetween. The remaining supply port of the eluent and the feed solution supply port are preferably provided in the same pipe as that for the supply port of the eluent having the strongest desorption strength or provided further upstream than the supply port of the eluent having the strongest desorption strength with the unit packed column interposed therebetween. The expression "provided in the same pipe as that for the supply port of the eluent having the strongest desorption strength or provided further upstream than the supply port of the eluent having the strongest desorption strength with the unit packed column interposed therebetween" means that a supply port of an eluent other than the strongest eluent or a feed solution supply port is provided in any pipes in the range which begins at the pipe in which the supply port of the strongest eluent is provided, extends toward upstream side, and ends at the pipe in which the strongly adsorptive fraction extraction port C is provided (in other words, means that a supply port of an eluent other than the strongest eluent or a feed solution supply port is provided in any pipes in the range which begins at the pipe in which the strongly adsorptive fraction extraction port C is provided, extends toward the downstream side, and ends at the pipe in which the supply port of the strongest eluent is provided; further, in other words, in a case where two or more unit packed columns are provided between the supply port of the strongest eluent and the strongly adsorptive fraction extraction port C, a supply port of an eluent or a feed solution supply port is not provided in the pipes connecting the two or more unit packed columns). In this case, in a case where eluents other than the strongest eluent are two or more kinds, some of two or more supply ports corresponding thereto may be provided in the same pipe and each of the supply ports may be provided in a separate pipe with the unit packed column interposed therebetween. Furthermore, supply ports of eluents other than the strongest eluent and the feed solution supply port may be provided in the same pipe.

Incidentally, providing one supply port of supply ports of eluents other than the eluent having the strongest desorption strength in the same pipe as that for the supply port of the eluent having the strongest desorption strength is a preferred embodiment of the present invention.

In the step (A), during the eluent having the strongest desorption strength of two or more kinds of eluents is supplied, an embodiment in which the same amount of a strongly adsorptive fraction as the supplied amount of the eluent having the strongest desorption strength is extracted from the downstream thereof is preferably employed. In this case, an embodiment in which at least one unit packed column is arranged between the supply port of the eluent having the strongest desorption strength and the strongly adsorptive fraction extraction port on the downstream thereof and other supply ports do not exist therebetween is preferably employed.

In the step (A), it is preferable to provide a time interval (sub-step) in which the same amount of an intermediately adsorptive fraction as the supplied amount of the eluent having the second strongest desorption strength is extracted from the downstream thereof while the eluent having the second strongest desorption strength of two or more kinds of eluents is supplied. In this case, at least one unit packed column (preferably, a plurality of unit packed columns) is arranged between the supply port of the eluent having the second strongest desorption strength and the intermediately adsorptive fraction extraction port on the downstream thereof. Furthermore, even if other supply ports exist between the pipe in which the supply port of the eluent having the second strongest desorption strength is provided and the pipe in which the intermediately adsorptive fraction extraction port on the downstream side thereof is provided, a liquid is not supplied from the other supply ports in the time interval in which the intermediately adsorptive fraction is extracted.

During carrying out the step (A), it is preferable to extract the weakly adsorptive fraction at all times. Therefore, even in a case where the step (A) is configured by a plurality of sub-steps, it is preferable to extract the weakly adsorptive fraction in the plurality of sub-steps at all times.

In the method of the present invention, it is preferable to use three or more kinds of eluents each having different desorption strength, more preferable to use four or more kinds of eluents each having different desorption strength, further preferable to use four to six kinds of eluents each having different desorption strength, and particularly preferable to use four or five kinds of eluents each having different desorption strength.

The type of eluents is not particularly limited and is appropriately set by a relationship with the type of adsorbents or the type of components in a feed solution. For example, in the case of using an ion-exchange resin as an adsorbent, a plurality of eluents each having different desorption strength can be prepared by changing the salt concentration of the eluent. For example, in the case of using a cation-exchange resin, a plurality of eluents having changed NaCl concentrations can be used as two or more kinds of eluents.

Preferred embodiments of combinations of sub-steps in the step (A) will be described below. These embodiments can be performed by using the system of FIG. 1 or a system capable of carrying out a target embodiment conforming to the system of FIG. 1. Furthermore, the embodiments described below are merely examples of the present invention, and for example, from the viewpoint of relative desorption strength, two or more kinds of eluents positioned as an eluent d-1 described below can be prepared, and the kind of the eluent d-1 to be used can also be changed between sub-steps of supplying the eluent d-1. The same applies to eluents d-II to d-V.

That is, regarding the "eluent d-1" in an embodiment of the present invention, in the case of using the "eluent d-1" in different sub-steps in the embodiment, the "eluents d-1" used in different sub-steps may be the same as or different from each other. The same applies to the eluents d-II to d-V.

Embodiment 1

In Embodiment 1, a circulation system having four or more unit packed columns is used. Here, it is assumed that this circulation system is divided into four sections 1 to 4 that are annularly continuous from the upstream side to the downstream side such that each section has at least one unit packed column. Further, as the eluent, four kinds of eluents d-I to d-IV each having different desorption strength are used.

In this Embodiment 1, the following sub-steps (A1-1), (A2-1), and (A3-1) are performed in the step (A).

In the present invention, the expression "sub-steps X, Y, and Z are performed in the step (A)" means that the step (A) includes the sub-steps X, Y, and Z, and the order for performing the sub-steps X, Y, and Z can be appropriately set in the range that the effects of the present invention are not impaired. Furthermore, the step (A) may include sub-steps other than the sub-steps X, Y, and Z.

As an embodiment in which "the sub-steps X, Y, and Z are performed in the step (A)", typically, an embodiment in which the sub-steps X, Y, and Z are performed in order as the step (A) is exemplified, but the present invention is not limited to this embodiment. That is, the expression "the sub-steps X, Y, and Z are performed in the step (A)" is not limited to an embodiment in which the sub-step Y is performed immediately after the sub-step X, the sub-step Z is performed immediately after the sub-step Y, the step (B) is performed immediately after the sub-step Z, and the sub-step X is performed immediately after the step (B). For example, in the embodiment including other sub-steps, other sub-steps (sub-steps other than the sub-steps X, Y, and Z) can be combined in at least one of before the sub-step X (between the step (B) and the sub-step X), between the sub-steps X and Y, between the sub-steps Y and Z, and between the sub-step Z and the step (B), in the range that the effects of the present invention are not impaired. There is a case where a target effect is obtainable even by incorporating additional sub-steps other than the sub-steps X, Y, and Z by adjustment of a supply flow rate, a flow velocity, eluent strength, or the like, and this can be easily understood by those skilled in the art who pertain to the present specification.

<Sub-Step (A1-1)>

An eluent d-I is supplied from an eluent supply port D-I while an upstream end of the section 1 is used as the eluent supply port D-I, a strongly adsorptive fraction is extracted from a strongly adsorptive fraction extraction port C while a downstream end of the section 1 is used as the extraction port C, an eluent d-II is supplied from an eluent supply port D-II while an upstream end of the section 2 is used as the eluent supply port D-II, a feed solution is supplied from a feed solution supply port F while an upstream end of the section 3 is used as the feed solution supply port F, and a weakly adsorptive fraction is extracted from a weakly adsorptive fraction extraction port A while a downstream end of the section 4 is used as the extraction port A, thereby most strengthening desorption strength of the eluent passing through the section 1, weakening desorption strength of the eluent passing through the section 2 more than desorption strength of the eluent passing through the section 1, and weakening desorption strength of the eluent passing through the sections 3 and 4 more than desorption strength of the eluent passing through the section 2.

In the sub-step (A1-1), the supply of each liquid and the extraction of each fraction described above are continuously performed (that is, in the sub-step (A1-1), at all times, all of the supply of each liquid and the extraction of each fraction described above are performed without intermission). The same applies to each sub-step described hereinafter.

Furthermore, in the present invention and the present specification, the description of the strength level of desorption strength of the eluent described in each sub-step corresponds to the description of the strength level of desorption strength of the eluent in the relevant sub-step but does not correspond to the description of the strength level of desorption strength of the eluent in different sub-steps. For example, in a case where the desorption strength of the eluent passing through the section 1 is described as strongest in one sub-step constituting the step (A) and the desorption strength of the eluent passing through the section 1 is described as strongest in another sub-step constituting the step (A), the desorption strength of the eluent passing through the section 1 in the one sub-step and the desorption strength of the eluent passing through the section 1 in the another sub-step may be the same as or different from each other.

<Sub-Step (A2-1)>

The eluent d-I is supplied from the eluent supply port D-I, a strongly adsorptive fraction is extracted from the extraction port C, the eluent d-II is supplied from the eluent supply port D-II, an eluent d-III is supplied from an eluent supply port D-III while an upstream end of the section 3 is used as the eluent supply port D-III, and a weakly adsorptive fraction is extracted from the extraction port A, thereby most strengthening desorption strength of the eluent passing through the section 1, weakening desorption strength of the eluent passing through the section 2 more than desorption strength of the eluent passing through the section 1, and weakening desorption strength of the eluent passing through the sections 3 and 4 more than desorption strength of the eluent passing through the section 2.

The eluent supply port D-III in this sub-step (A2-1) is provided in the same pipe as that for the feed solution supply port F in the sub-step (A1-1).

<Sub-Step (A3-1)>

The eluent d-I is supplied from the eluent supply port D-I, a strongly adsorptive fraction is extracted from the extraction port C, the eluent d-II is supplied from the eluent supply port D-II, an intermediately adsorptive fraction is extracted from an intermediately adsorptive fraction extraction port B while a downstream end of the section 3 is used as the extraction port B, an eluent d-IV is supplied from an eluent supply port D-IV while an upstream end of the section 4 is used as the eluent supply port D-IV, and a weakly adsorptive fraction is extracted from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the section 4 more than desorption strength of the eluent passing through the sections 2 and 3.

Desorption strength of the eluent passing through the sections 3 and 4 in the sub-step (A2-1) is also preferably equal to desorption strength of the eluent passing through the section 4 in the sub-step (A3-1).

As an example of the sub-step (A1-1), a sub-step of carrying out the following sub-step (A1-1ex) is mentioned, but the sub-step (A1-1) is not limited to the sub-step (A1-1ex).

<Sub-Step (A1-1ex)>

An eluent d1 having the strongest desorption strength of four kinds of eluents is supplied from an eluent supply port D1 while an upstream end of the section 1 is used as the eluent supply port D1, a strongly adsorptive fraction is extracted from the strongly adsorptive fraction extraction port C while a downstream end of the section 1 is used as the extraction port C, an eluent d2 having the second strongest desorption strength of the four kinds of eluents is supplied from an eluent supply port D2 while an upstream end of the section 2 is used as the eluent supply port D2, a feed solution is supplied from the feed solution supply port F while an upstream end of the section 3 is used as the feed solution supply port F, and a weakly adsorptive fraction is extracted from a weakly adsorptive fraction extraction port A while a downstream end of the section 4 is used as the extraction port A.

As an example of the sub-step (A2-1), a sub-step of carrying out the following sub-step (A2-1ex) is mentioned, but the sub-step (A2-1) is not limited to the sub-step (A2-1ex).

<Sub-Step (A2-1ex)>

The eluent d1 is supplied from the eluent supply port D1, a strongly adsorptive fraction is extracted from the strongly adsorptive fraction extraction port C, the eluent d2 is supplied from the eluent supply port D2, an eluent d3 having the weakest desorption strength of four kinds of eluents from an eluent supply port D3 while an upstream end of the section 3 is used as the eluent supply port D3, and a weakly adsorptive fraction is extracted from the weakly adsorptive fraction extraction port A.

The eluent supply port D3 in this sub-step (A2-1ex) is provided in the same pipe as that for the feed solution supply port F in the sub-step (A1-1).

As an example of the sub-step (A3-1), a sub-step of carrying out the following sub-step (A3-1ex) is mentioned, but the sub-step (A3-1) is not limited to the sub-step (A3-1ex).

<Sub-Step (A3-1ex)>

The eluent d1 is supplied from the eluent supply port D1, a strongly adsorptive fraction is extracted from the strongly adsorptive fraction extraction port C, the eluent d2 is supplied from the eluent supply port D2, an intermediately adsorptive fraction is extracted from an intermediately adsorptive fraction extraction port B while a downstream end of the section 3 is used as the extraction port B, an eluent d4 having the third strongest desorption strength of four kinds of eluents from an eluent supply port D4 while an upstream end of the section 4 is used as the eluent supply port D4, and a weakly adsorptive fraction is extracted from the weakly adsorptive fraction extraction port A.

Figure 2:
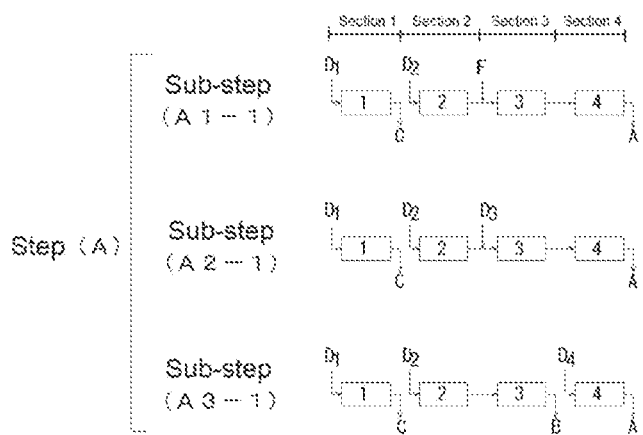
FIG. 2 is a flow diagram of respective sub-steps constituting step (A) in an embodiment of the simulated moving-bed type chromatographic separation method of the present invention.

A case where each section has one unit packed column is used as an example, and a flow diagram in a case where the sub-steps (A1-1ex), (A2-1ex), and (A3-1ex) are sequentially performed in the step (A) is illustrated in FIG. 2. In FIG. 2, a square enclosure indicates one unit packed column, and the number in the enclosure indicates the number of the unit packed column (the number is given in order from left).

Figure 3:
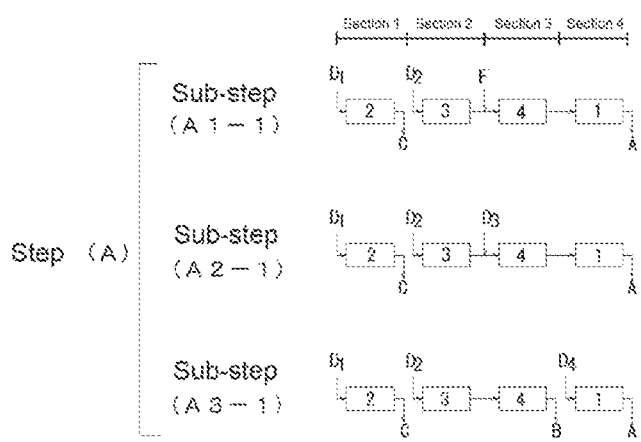
FIG. 3 is a flow diagram of respective sub-steps constituting step (A) after the step (A) illustrated in FIG. 2 is finished and then step (B) is carried out.

After the step (A) in which the sub-steps (A1-1ex), (A2-1ex), and (A3-1ex) are sequentially performed, the feed solution supply port F, the eluent supply port D, the weakly adsorptive fraction extraction port A, the intermediately adsorptive fraction extraction port B, and the strongly adsorptive fraction extraction port C are shifted to the downstream side, while maintaining a relative positional relationship therebetween, by the step (B), and then the sub-steps (A1-1ex), (A2-1ex), and (A3-1ex) are sequentially performed. The flow diagram in this case is illustrated in FIG. 3. The unit packed column arranged in each section illustrated in FIG. 2 is shifted to the downstream side one by one in FIG. 3. In this case, a process in which the step (A) illustrated in FIG. 2 is started and then the step (B) is performed is designated as one set, this process is performed at four sets, and it returns to the embodiment illustrated in FIG. 2 again.

Embodiment 2

Similarly to Embodiment 1, also in Embodiment 2, a circulation system having four or more unit packed columns is used. Here, it is assumed that this circulation system is divided into four sections 1 to 4 that are annularly continuous from the upstream side to the downstream side such that each section has at least one unit packed column. Further, as the eluent, four kinds of eluents d-I to d-IV each having different desorption strength are used.

In this Embodiment 2, the following sub-steps (A1-2), (A2-2), and (A3-2) are sequentially performed as the step (A).

<Sub-Step (A1-2)>

An eluent d-II is supplied from an eluent supply port D-II while an upstream end of the section 1 is used as the eluent supply port D-II, a feed solution is supplied is supplied from a feed solution supply port F while an upstream end of the section 3 is used as the feed solution supply port F, and a weakly adsorptive fraction is extracted from a weakly adsorptive fraction extraction port A while a downstream end of the section 4 is used as the extraction port A, thereby most strengthening desorption strength of the eluent passing through the sections 1 and 2, and weakening desorption strength of the eluent passing through the sections 3 and 4 more than desorption strength of the eluent passing through the sections 1 and 2.

<Sub-Step (A2-2)>

An eluent d-I is supplied from an eluent supply port D-I while an upstream end of the section 1 is used as the eluent supply port D-I, a strongly adsorptive fraction is extracted from a strongly adsorptive fraction extraction port C while a downstream end of the section 1 is used as the extraction port C, an eluent d-II is supplied from an eluent supply port D-II while an upstream end of the section 2 is used as the eluent supply port D-II, an eluent d-III is supplied from an eluent supply port D-III while an upstream end of the section 3 is used as the eluent supply port D-III, and a weakly adsorptive fraction is extracted from the extraction port A, thereby most strengthening desorption strength of the eluent passing through the section 1, weakening desorption strength of the eluent passing through the section 2 more than desorption strength of the eluent passing through the section 1, and weakening desorption strength of the eluent passing through the sections 3 and 4 more than desorption strength of the eluent passing through the section 2.

The eluent supply port D-I in this sub-step (A2-2) is provided in the same pipe as that for the eluent supply port D-II in the sub-step (A1-2). Furthermore, the eluent supply port D-III is provided in the same pipe as that for the feed solution supply port F.

Desorption strength of the eluent passing through the section 1 in this sub-step (A2-2) is preferably stronger than desorption strength of the eluent passing through the section 1 in the sub-step (A1-2).

<Sub-Step (A3-2)>

The eluent d-I is supplied from the eluent supply port D-I, a strongly adsorptive fraction is extracted from the extraction port C, the eluent d-II is supplied from the eluent supply port D-II in the sub-step (A2-2), an intermediately adsorptive fraction is extracted from an intermediately adsorptive fraction extraction port B while a downstream end of the section 3 is used as the extraction port B, an eluent d-IV is supplied from an eluent supply port D-IV while an upstream end of the section 4 is used as the eluent supply port D-IV, and a weakly adsorptive fraction is extracted from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the section 4 more than desorption strength of the eluent passing through the sections 2 and 3.

As an example of the sub-step (A1-2), a sub-step of carrying out the following sub-step (A1-2ex) is mentioned, but the sub-step (A1-2) is not limited to the sub-step (A1-2ex).

<Sub-Step (A1-2ex)>

An eluent d2 having the second strongest desorption strength of four kinds of eluents is supplied from an eluent supply port D2 while an upstream end of the section 1 is used as the eluent supply port D2, a feed solution is supplied from the feed solution supply port F while an upstream end of the section 3 is used as the feed solution supply port F, and a weakly adsorptive fraction is extracted from a weakly adsorptive fraction extraction port A while a downstream end of the section 4 is used as the extraction port A.

As an example of the sub-step (A2-2), a sub-step of carrying out the following sub-step (A2-2ex) is mentioned, but the sub-step (A2-2) is not limited to the sub-step (A2-2ex).

<Sub-Step (A2-2ex)>

An eluent d1 having the strongest desorption strength of four kinds of eluents is supplied from an eluent supply port D1 while an upstream end of the section 1 is used as the eluent supply port D1, a strongly adsorptive fraction is extracted from the strongly adsorptive fraction extraction port C while a downstream end of the section 1 is used as the extraction port C, an eluent d2 having the second strongest desorption strength of the four kinds of eluents is supplied from an eluent supply port D2 while an upstream end of the section 2 is used as the eluent supply port D2, an eluent d3 having the weakest desorption strength of the four kinds of eluents is supplied from an eluent supply port D3 while an upstream end of the section 3 is used as the eluent supply port D3, and a weakly adsorptive fraction is extracted from the weakly adsorptive fraction extraction port A.

The eluent supply port D1 in this sub-step (A2-2ex) is provided in the same pipe as that for the eluent supply port D2 in the sub-step (A1-2ex). Furthermore, the eluent supply port D3 is provided in the same pipe as that for the feed solution supply port F in the sub-step (A1-2ex).

As an example of the sub-step (A3-2), a sub-step of carrying out the following sub-step (A3-2ex) is mentioned, but the sub-step (A3-2) is not limited to the sub-step (A3-2ex).

<Sub-Step (A3-2ex)>

The eluent d1 is supplied from the eluent supply port D1, a strongly adsorptive fraction is extracted from the strongly adsorptive fraction extraction port C, the eluent d2 is supplied from the eluent supply port D2 in the sub-step (A2-2ex), an intermediately adsorptive fraction is extracted from an intermediately adsorptive fraction extraction port B while a downstream end of the section 3 is used as the extraction port B, an eluent d4 having the third strongest desorption strength of the four kinds of eluents from an eluent supply port D4 while an upstream end of the section 4 is used as the eluent supply port D4, and a weakly adsorptive fraction is extracted from the weakly adsorptive fraction extraction port A.

Figure 4:
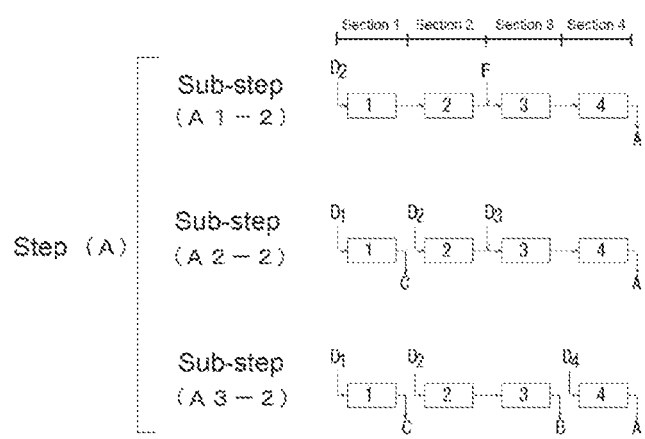
FIG. 4 is a flow diagram of respective sub-steps constituting step (A) in another embodiment of the simulated moving-bed type chromatographic separation method of the present invention.

A case where each section has one unit packed column is used as an example, and a flow diagram in a case where the sub-steps (A1-2ex), (A2-2ex), and (A3-2ex) are sequentially performed in the step (A) is illustrated in FIG. 4. In FIG. 4, a square enclosure indicates one unit packed column, and the number in the enclosure indicates the number of the unit packed column.

Figure 5:
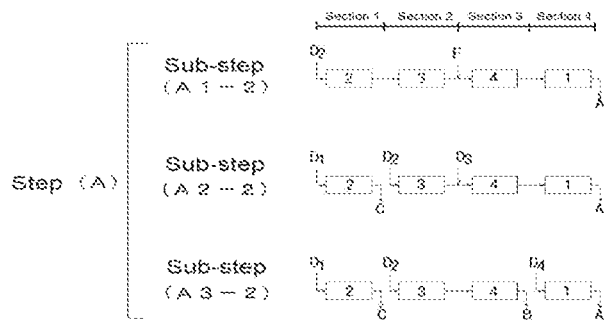
FIG. 5 is a flow diagram of respective sub-steps constituting step (A) after the step (A) illustrated in FIG. 4 is finished and then step (B) is carried out.

After the step (A) in which the sub-steps (A1-2ex), (A2-2ex), and (A3-2ex) are sequentially performed, the feed solution supply port F, the eluent supply port D, the weakly adsorptive fraction extraction port A, the intermediately adsorptive fraction extraction port B, and the strongly adsorptive fraction extraction port C are shifted to the downstream side, while maintaining a relative positional relationship therebetween, by the step (B), and then the sub-steps (A1-2ex), (A2-2ex), and (A3-2ex) are sequentially performed. The flow diagram in this case is illustrated in FIG. 5. The unit packed column arranged in each section illustrated in FIG. 4 is shifted to the downstream side one by one in FIG. 5. In this case, a process in which the step (A) illustrated in FIG. 4 is started and then the step (B) is performed is designated as one set, this process is performed at four sets, and it returns to the embodiment illustrated in FIG. 4 again.

Embodiment 3

In Embodiment 3, a circulation system having five or more unit packed columns is used. Here, it is assumed that this circulation system is divided into five sections 1 to 5 that are annularly continuous from the upstream side to the downstream side such that each section has at least one unit packed column. Further, as the eluent, four kinds of eluents d-I to d-IV each having different desorption strength are used.

In this Embodiment 3, the following sub-steps (A1-3), (A2-3), and (A3-3) are sequentially performed as the step (A).

<Sub-Step (A1-3)>

An eluent d-II is supplied from an eluent supply port D-II while an upstream end of the section 1 is used as the eluent supply port D-II, a feed solution is supplied from a feed solution supply port F while an upstream end of the section 3 is used as the feed solution supply port F, an eluent d-III is supplied from an eluent supply port D-III while an upstream end of the section 4 is used as the eluent supply port D-III, and a weakly adsorptive fraction is extracted from a weakly adsorptive fraction extraction port A while a downstream end of the section 5 is used as the extraction port A, thereby most strengthening desorption strength of the eluent passing through the sections 1 and 2, setting desorption strength of the eluent passing through the section 3 to be equal to desorption strength of the eluent passing through the sections 1 and 2 or weakening desorption strength of the eluent passing through the section 3 more than desorption strength of the eluent passing through the sections 1 and 2, and weakening desorption strength of the eluent passing through the sections 4 and 5 more than desorption strength of the eluent passing through the section 3.

<Sub-Step (A2-3)>

An eluent d-I is supplied from an eluent supply port D-I while an upstream end of the section 1 is used as the eluent supply port D-I, a strongly adsorptive fraction is extracted from a strongly adsorptive fraction extraction port C while a downstream end of the section 1 is used as the extraction port C, an eluent d-II is supplied from an eluent supply port D-II while an upstream end of the section 2 is used as the eluent supply port D-II, the eluent d-III is supplied from the eluent supply port D-III, and a weakly adsorptive fraction is extracted from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3.

Desorption strength of the eluent passing through the section 1 in this sub-step (A2-3) is preferably stronger than desorption strength of the eluent passing through the section 1 in the sub-step (A1-3).

The eluent supply port D-I in this sub-step (A2-3) is provided in the same pipe as that for the eluent supply port D-II in the sub-step (A1-3).

<Sub-Step (A3-3)>

The eluent d-I is supplied from the eluent supply port D-I, a strongly adsorptive fraction is extracted from the extraction port C, the eluent d-II is supplied from the eluent supply port D-II in the sub-step (A2-3), an intermediately adsorptive fraction is extracted from an intermediately adsorptive fraction extraction port B while a downstream end of the section 4 is used as the extraction port B, an eluent d-IV is supplied from an eluent supply port D-IV while an upstream end of the section 5 is used as the eluent supply port D-IV, and a weakly adsorptive fraction is extracted from the extraction port A, thereby most strengthening desorption strength of the eluent passing through the section 1, weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

As an example of the sub-step (A1-3), a sub-step of carrying out the following sub-step (A1-3ex) is mentioned, but the sub-step (A1-3) is not limited to the sub-step (A1-3ex).

<Sub-Step (A1-3ex)>

An eluent d2 having the second strongest desorption strength of four kinds of eluents is supplied from an eluent supply port D2 while an upstream end of the section 1 is used as the eluent supply port D2, a feed solution is supplied from the feed solution supply port F while an upstream end of the section 3 is used as the feed solution supply port F, an eluent d3 having the weakest desorption strength of the four kinds of eluents is supplied from an eluent supply port D3 while an upstream end of the section 4 is used as the eluent supply port D3, and a weakly adsorptive fraction is extracted from a weakly adsorptive fraction extraction port A while a downstream end of the section 5 is used as the extraction port A.

As an example of the sub-step (A2-3), a sub-step of carrying out the following sub-step (A2-3ex) is mentioned, but the sub-step (A2-3) is not limited to the sub-step (A2-3ex).

<Sub-Step (A2-3ex)>

An eluent d1 having the strongest desorption strength of four kinds of eluents is supplied from an eluent supply port D1 while an upstream end of the section 1 is used as the eluent supply port D1, a strongly adsorptive fraction is extracted from the strongly adsorptive fraction extraction port C while a downstream end of the section 1 is used as the extraction port C, an eluent d2 having the second strongest desorption strength of the four kinds of eluents is supplied from an eluent supply port D2 while an upstream end of the section 2 is used as the eluent supply port D2, the eluent d3 is supplied the eluent supply port D3, and a weakly adsorptive fraction is extracted from the weakly adsorptive fraction extraction port A.

The eluent supply port D1 in this sub-step (A2-3ex) is provided in the same pipe as that for the eluent supply port D2 in the sub-step (A1-3ex).

As an example of the sub-step (A3-3), a sub-step of carrying out the following sub-step (A3-3ex) is mentioned, but the sub-step (A3-3) is not limited to the sub-step (A3-3ex).

<Sub-Step (A3-3ex)>

The eluent d1 is supplied from the eluent supply port D1, a strongly adsorptive fraction is extracted from the strongly adsorptive fraction extraction port C, the eluent d2 is supplied from the eluent supply port D2 in the sub-step (A2-3ex), an intermediately adsorptive fraction is extracted from an intermediately adsorptive fraction extraction port B while a downstream end of the section 4 is used as the extraction port B, an eluent d4 having the third strongest desorption strength of four kinds of eluents from an eluent supply port D4 while an upstream end of the section 5 is used as the eluent supply port D4, and a weakly adsorptive fraction is extracted from the weakly adsorptive fraction extraction port A.

Figure 6:
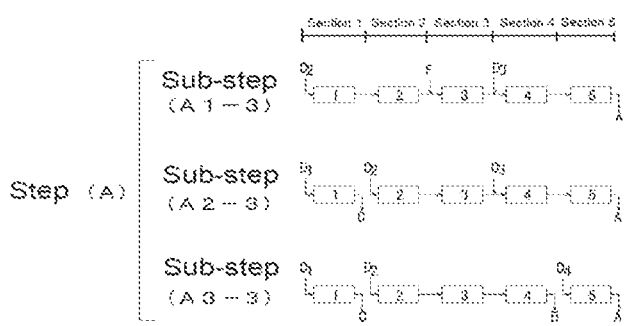
FIG. 6 is a flow diagram of respective sub-steps constituting step (A) in still another embodiment of the simulated moving-bed type chromatographic separation method of the present invention.

A case where each section has one unit packed column is used as an example, and a flow diagram in a case where the sub-steps (A1-3ex), (A2-3ex), and (A3-3ex) are sequentially performed in the step (A) is illustrated in FIG. 6. In FIG. 6, a square enclosure indicates one unit packed column, and the number in the enclosure indicates the number of the unit packed column.

Figure 7:
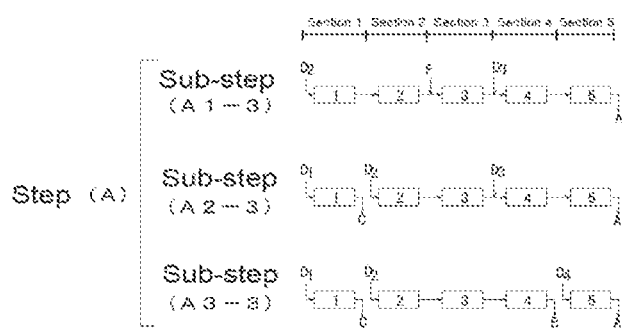
FIG. 7 is a flow diagram of respective sub-steps constituting step (A) after the step (A) illustrated in FIG. 6 is finished and then step (B) is carried out.

After the step (A) in which the sub-steps (A1-3ex), (A2-3ex), and (A3-3ex) are sequentially performed, the feed solution supply port F, the eluent supply port D, the weakly adsorptive fraction extraction port A, the intermediately adsorptive fraction extraction port B, and the strongly adsorptive fraction extraction port C are shifted to the downstream side, while maintaining a relative positional relationship therebetween, by the step (B), and then the sub-steps (A1-3ex), (A2-3ex), and (A3-3ex) are sequentially performed. The flow diagram in this case is illustrated in FIG. 7. The unit packed column arranged in each section illustrated in FIG. 6 is shifted to the downstream side one by one in FIG. 7. In this case, a process in which the step (A) illustrated in FIG. 6 is started and then the step (B) is performed is designated as one set, this process is performed at five sets, and it returns to the embodiment illustrated in FIG. 6 again.

Embodiment 4

In Embodiment 4, a circulation system having seven or more unit packed columns is used. Here, it is assumed that this circulation system is divided into five sections 1 to 5 that are annularly continuous from the upstream side to the downstream side such that each section has at least one unit packed column. Further, as the eluent, five kinds of eluents d-I to d-V each having different desorption strength are used.

In this Embodiment 4, the following sub-steps (A1-4), (A2-4), and (A3-4) are sequentially performed as the step (A).

<Sub-Step (A1-4)>

An eluent d-II is supplied from an eluent supply port D-II while an upstream end of the section 1 is used as the eluent supply port D-II, a feed solution is supplied from a feed solution supply port F while an upstream end of the section 3 is used as the feed solution supply port F, an eluent d-III is supplied from an eluent supply port D-III while an upstream end of the section 4 is used as the eluent supply port D-III, and a weakly adsorptive fraction is extracted from the extraction port A while a downstream end of the section 5 is used as the extraction port A, thereby most strengthening desorption strength of the eluent passing through the sections 1 and 2, setting desorption strength of the eluent passing through the section 3 to be equal to desorption strength of the eluent passing through the sections 1 and 2 or weakening desorption strength of the eluent passing through the section 3 more than desorption strength of the eluent passing through the sections 1 and 2, and weakening desorption strength of the eluent passing through the sections 4 and 5 more than desorption strength of the eluent passing through the section 3.

<Sub-Step (A2-4)>

An eluent d-I is supplied from an eluent supply port D-I while an upstream end of the section 1 is used as the eluent supply port D-I, a strongly adsorptive fraction is extracted from a strongly adsorptive fraction extraction port C while a downstream end of the section 1 is used as the extraction port C, an eluent d-II is supplied from an eluent supply port D-II while an upstream end of the section 2 is used as the eluent supply port D-II, an eluent d-IV is supplied from an eluent supply port D-IV while an upstream end of the section 4 is used as the eluent supply port D-IV, and a weakly adsorptive fraction is extracted from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3.

Desorption strength of the eluent passing through the section 1 in this sub-step (A2-4) is preferably stronger than desorption strength of the eluent passing through the section 1 in the sub-step (A1-4).

The eluent supply port D-I in this sub-step (A2-4) is provided in the same pipe as that for the eluent supply port D-II in the sub-step (A1-4).

<Sub-Step (A3-4)>

The eluent d-I is supplied from the eluent supply port D-I, a strongly adsorptive fraction is extracted from the extraction port C, the eluent d2 is supplied from the eluent supply port D2 in the sub-step (A2-4), an intermediately adsorptive fraction is extracted from an intermediately adsorptive fraction extraction port B while a downstream end of the section 4 is used as the extraction port B, an eluent d-V is supplied from an eluent supply port D-V while an upstream end of the section 5 is used as the eluent supply port D-V, and a weakly adsorptive fraction is extracted from the extraction port A, thereby most strengthening desorption strength of the eluent passing through the section 1, weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

As an example of the sub-step (A1-4), a sub-step of carrying out the following sub-step (A1-4ex) is mentioned, but the sub-step (A1-4) is not limited to the sub-step (A1-4ex).

<Sub-Step (A1-4ex)>

An eluent d2 having the second strongest desorption strength of five kinds of eluents is supplied from an eluent supply port D2 while an upstream end of the section 1 is used as the eluent supply port D2, a feed solution is supplied from the feed solution supply port F while an upstream end of the section 3 is used as the feed solution supply port F, an eluent d3 having the weakest desorption strength of the five kinds of eluents is supplied from an eluent supply port D3 while an upstream end of the section 4 is used as the eluent supply port D3, and a weakly adsorptive fraction is extracted from a weakly adsorptive fraction extraction port A while a downstream end of the section 5 is used as the extraction port A.

Desorption strength of the eluent passing through the sections 4 and 5 in the sub-step (A3-3) is also preferably equal to desorption strength of the eluent passing through the section 5 in the sub-step (A3-4).

As an example of the sub-step (A2-4), a sub-step of carrying out the following sub-step (A2-4ex) is mentioned, but the sub-step (A2-4) is not limited to the sub-step (A2-4ex).

<Sub-Step (A2-4ex)>

An eluent d1 having the strongest desorption strength of five kinds of eluents is supplied from an eluent supply port D1 while an upstream end of the section 1 is used as the eluent supply port D1, a strongly adsorptive fraction is extracted from the strongly adsorptive fraction extraction port C while a downstream end of the section 1 is used as the extraction port C, an eluent d2 having the second strongest desorption strength of the five kinds of eluents is supplied from an eluent supply port D2 while an upstream end of the section 2 is used as the eluent supply port D2, an eluent d4 having the fourth strongest desorption strength of the five kinds of eluents is supplied from an eluent supply port D4 while an upstream end of the section 4 is used as the eluent supply port D4, and a weakly adsorptive fraction is extracted from the weakly adsorptive fraction extraction port A.

The eluent supply port D1 in this sub-step (A2-4ex) is provided in the same pipe as that for the eluent supply port D2 in the sub-step (A1-4ex).

As an example of the sub-step (A3-4), a sub-step of carrying out the following sub-step (A3-4ex) is mentioned, but the sub-step (A3-4) is not limited to the sub-step (A3-4ex).

<Sub-Step (A3-4ex)>

The eluent d1 is supplied from the eluent supply port D1, a strongly adsorptive fraction is extracted from the strongly adsorptive fraction extraction port C, the eluent d2 is supplied from the eluent supply port D2 in the sub-step (A2-4ex), an intermediately adsorptive fraction is extracted from an intermediately adsorptive fraction extraction port B while a downstream end of the section 4 is used as the extraction port B, an eluent d5 having the third strongest desorption strength of five kinds of eluents from an eluent supply port D5 while an upstream end of the section 5 is used as the eluent supply port D5, and a weakly adsorptive fraction is extracted from the weakly adsorptive fraction extraction port A.

Figure 8:
FIG. 8 is a flow diagram of respective sub-steps constituting step (A) in still another embodiment of the simulated moving-bed type chromatographic separation method of the present invention.

A flow diagram in a case where the sub-steps (A1-4ex), (A2-4ex), and (A3-4ex) are sequentially performed in the step (A) is illustrated in FIG. 8. In FIG. 8, a square enclosure indicates one unit packed column, and the number in the enclosure indicates the number of the unit packed column. Furthermore, an embodiment illustrated in FIG. 8 has seven unit packed columns and includes one unit packed column in the section 1, two unit packed columns in the section 2, two unit packed columns in the section 3, one unit packed column in the section 4, and one unit packed column in the section 5.

Figure 9:
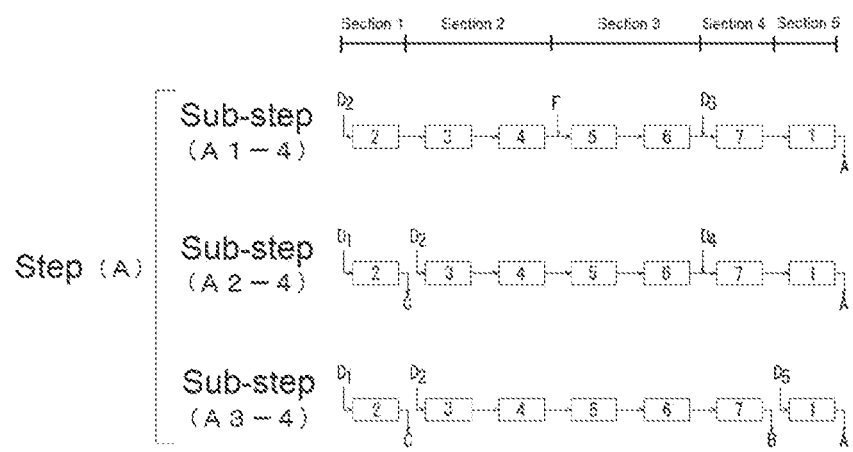
FIG. 9 is a flow diagram of respective sub-steps constituting step (A) after the step (A) illustrated in FIG. 8 is finished and then step (B) is carried out.

After the step (A) in which the sub-steps (A1-4ex), (A2-4ex), and (A3-4ex) are sequentially performed, the feed solution supply port F, the eluent supply port D, the weakly adsorptive fraction extraction port A, the intermediately adsorptive fraction extraction port B, and the strongly adsorptive fraction extraction port C are shifted to the downstream side, while maintaining a relative positional relationship therebetween, by the step (B), and then the sub-steps (A1-4ex), (A2-4ex), and (A3-4ex) are sequentially performed. The flow diagram in this case is illustrated in FIG. 9. The unit packed column arranged in each section illustrated in FIG. 8 is shifted to the downstream side one by one in FIG. 9. In this case, a process in which the step (A) illustrated in FIG. 8 is started and then the step (B) is performed is designated as one set, this process is performed at seven sets, and it returns to the embodiment illustrated in FIG. 8 again.

Embodiment 5

In Embodiment 5, a circulation system having five or more unit packed columns is used. Here, it is assumed that this circulation system is divided into five sections 1 to 5 that are annularly continuous from the upstream side to the downstream side such that each section has at least one unit packed column. Further, as the eluent, four kinds of eluents d-I to d-IV each having different desorption strength are used.

In this Embodiment 5, the following sub-steps (A1-5), (A2-5), and (A3-5) are sequentially performed as the step (A).

<Sub-Step (A1-5)>

A feed solution is supplied from a feed solution supply port F while an upstream end of the section 3 is used as the feed solution supply port F, an eluent d-III is supplied from an eluent supply port D-III while an upstream end of the section 4 is used as the eluent supply port D-III, and a weakly adsorptive fraction is extracted from a weakly adsorptive fraction extraction port A while a downstream end of the section 5 is used as the extraction port A, thereby most strengthening desorption strength of the eluent passing through the section 3, and weakening desorption strength of the eluent passing through the sections 4 and 5 more than desorption strength of the eluent passing through the section 3.

<Sub-Step (A2-5)>

An eluent d-I is supplied from an eluent supply port D-I while an upstream end of the section 1 is used as the eluent supply port D-I, a strongly adsorptive fraction is extracted from a strongly adsorptive fraction extraction port C while a downstream end of the section 1 is used as the extraction port C, an eluent d-II is supplied from an eluent supply port D-II while an upstream end of the section 2 is used as the eluent supply port D-II, the eluent d-III is supplied from the eluent supply port D-III, and a weakly adsorptive fraction is extracted from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3.

<Sub-Step (A3-5)>

The eluent d-I is supplied from the eluent supply port D-I, a strongly adsorptive fraction is extracted from the extraction port C, the eluent d-II is supplied from the eluent supply port D-II, an intermediately adsorptive fraction is extracted from an intermediately adsorptive fraction extraction port B while a downstream end of the section 4 is used as the extraction port B, an eluent d-IV is supplied from an eluent supply port D-IV while an upstream end of the section 5 is used as the eluent supply port D-IV, and a weakly adsorptive fraction is extracted from the extraction port A, thereby most strengthening desorption strength of the eluent passing through the section 1, weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

Desorption strength of the eluent passing through the section 1 in this sub-step (A3-5) is preferably equal to desorption strength of the eluent passing through the section 1 in the sub-step (A2-5).

As an example of the sub-step (A1-5), a sub-step of carrying out the following sub-step (A1-5ex) is mentioned, but the sub-step (A1-5) is not limited to the sub-step (A1-5ex).

<Sub-Step (A1-5Ex)>

A feed solution is supplied from a feed solution supply port F while an upstream end of the section 3 is used as the feed solution supply port F, an eluent d3 having the weakest desorption strength of four kinds of eluents from an eluent supply port D3 while an upstream end of the section 4 is used as the eluent supply port D3, and a weakly adsorptive fraction is extracted from a weakly adsorptive fraction extraction port A while a downstream end of the section 5 is used as the extraction port A.

As an example of the sub-step (A2-5), a sub-step of carrying out the following sub-step (A2-5ex) is mentioned, but the sub-step (A2-5) is not limited to the sub-step (A2-5ex).

<Sub-Step (A2-5ex)>

An eluent d1 having the strongest desorption strength of four kinds of eluents is supplied from an eluent supply port D1 while an upstream end of the section 1 is used as the eluent supply port D1, a strongly adsorptive fraction is extracted from the strongly adsorptive fraction extraction port C while a downstream end of the section 1 is used as the extraction port C, an eluent d2 having the second strongest desorption strength of the four kinds of eluents is supplied from an eluent supply port D2 while an upstream end of the section 2 is used as the eluent supply port D2, the eluent d3 is supplied the eluent supply port D3, and a weakly adsorptive fraction is extracted from the weakly adsorptive fraction extraction port A.

As an example of the sub-step (A3-5), a sub-step of carrying out the following sub-step (A3-5ex) is mentioned, but the sub-step (A3-5) is not limited to the sub-step (A3-5ex).

<Sub-Step (A3-5ex)>

The eluent d1 is supplied from the eluent supply port D1, a strongly adsorptive fraction is extracted from the strongly adsorptive fraction extraction port C, the eluent d2 is supplied from the eluent supply port D2, an intermediately adsorptive fraction is extracted from an intermediately adsorptive fraction extraction port B while a downstream end of the section 4 is used as the extraction port B, an eluent d4 having the third strongest desorption strength of four kinds of eluents from an eluent supply port D4 while an upstream end of the section 5 is used as the eluent supply port D4, and a weakly adsorptive fraction is extracted from the weakly adsorptive fraction extraction port A.

Figure 13:
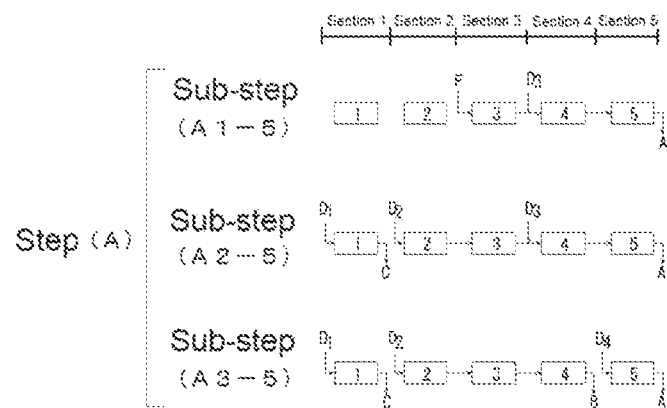
FIG. 13 is a flow diagram of respective sub-steps constituting step (A) in still another embodiment of the simulated moving-bed type chromatographic separation method of the present invention.

A case where each section has one unit packed column is used as an example, and a flow diagram in a case where the sub-steps (A1-5ex), (A2-5ex), and (A3-5ex) are sequentially performed in the step (A) is illustrated in FIG. 13. In FIG. 13, a square enclosure indicates one unit packed column, and the number in the enclosure indicates the number of the unit packed column.

Figure 14:
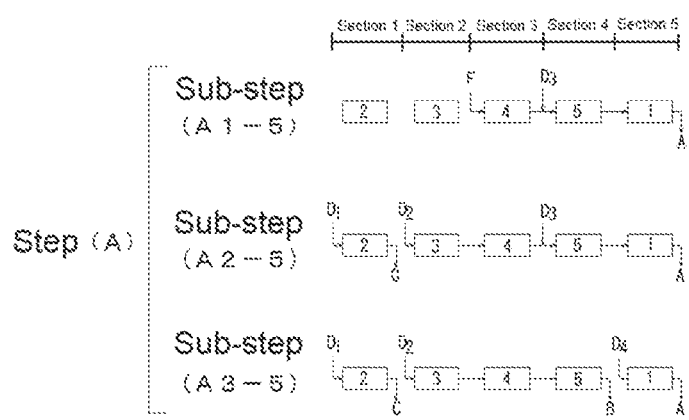
FIG. 14 is a flow diagram of respective sub-steps constituting step (A) after the step (A) illustrated in FIG. 13 is finished and then step (B) is carried out.

After the step (A) in which the sub-steps (A1-5ex), (A2-5ex), and (A3-5ex) are sequentially performed, the feed solution supply port F, the eluent supply port D, the weakly adsorptive fraction extraction port A, the intermediately adsorptive fraction extraction port B, and the strongly adsorptive fraction extraction port C are shifted to the downstream side, while maintaining a relative positional relationship therebetween, by the step (B), and then the sub-steps (A1-5ex), (A2-5ex), and (A3-5ex) are sequentially performed. The flow diagram in this case is illustrated in FIG. 14. The unit packed column arranged in each section illustrated in FIG. 13 is shifted to the downstream side one by one in FIG. 14. In this case, a process in which the step (A) illustrated in FIG. 13 is started and then the step (B) is performed is designated as one set, this process is performed at five sets, and it returns to the embodiment illustrated in FIG. 13 again.

Embodiment 6

In Embodiment 6, a circulation system having five or more unit packed columns is used. Here, it is assumed that this circulation system is divided into five sections 1 to 5 that are annularly continuous from the upstream side to the downstream side such that each section has at least one unit packed column. Further, as the eluent, four kinds of eluents d-I to d-IV each having different desorption strength are used.

In this Embodiment 6, the following sub-steps (A1-6), (A2-6), and (A3-6) are sequentially performed as the step (A).

<Sub-Step (A1-6)>

An eluent d-II is supplied from an eluent supply port D-II while an upstream end of the section 1 is used as the eluent supply port D-II, an intermediately adsorptive fraction is extracted from an intermediately adsorptive fraction extraction port B while a downstream end of the section 3 is used as the extraction port B, an eluent d-IV is supplied from an eluent supply port D-IV while an upstream end of the section 4 is used as the eluent supply port D-IV, and a weakly adsorptive fraction is extracted from a weakly adsorptive fraction extraction port A while a downstream end of the section 5 is used as the extraction port A, thereby most strengthening desorption strength of the eluent passing through the sections 1, 2, and 3, and weakening desorption strength of the eluent passing through the sections 4 and 5 more than desorption strength of the eluent passing through the sections 1, 2, and 3.

<Sub-Step (A2-6)>

An eluent d-I is supplied from an eluent supply port D-I while an upstream end of the section 1 is used as the eluent supply port D-I, a strongly adsorptive fraction is extracted from a strongly adsorptive fraction extraction port C while a downstream end of the section 1 is used as the extraction port C, a feed solution is supplied from the feed solution supply port F while an upstream end of the section 3 is used as the feed solution supply port F, an eluent d-III is supplied from an eluent supply port D-III while an upstream end of the section 4 is used as the eluent supply port D-III, and a weakly adsorptive fraction is extracted from the extraction port A, thereby most strengthening desorption strength of the eluent passing through the section 1, weakening desorption strength of the eluent passing through the section 3 more than desorption strength of the eluent passing through the section 1, and weakening desorption strength of the eluent passing through the sections 4 and 5 more than desorption strength of the eluent passing through the section 3.

Desorption strength of the eluent passing through the section 1 in this sub-step (A2-6) is preferably stronger than desorption strength of the eluent passing through the section 1 in the sub-step (A1-6).

The eluent supply port D-I in this sub-step (A2-6) is provided in the same pipe as that for the eluent supply port D-II in the sub-step (A1-6).

<Sub-Step (A3-6)>

The eluent d-I is supplied from the eluent supply port D-I, a strongly adsorptive fraction is extracted from the extraction port C, the eluent d-II is supplied from the eluent supply port D-II while an upstream end of the section 2 is used as the eluent supply port D-II, the eluent d-III is supplied from the eluent supply port D-III, and a weakly adsorptive fraction is extracted from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3.

Desorption strength of the eluent passing through the section 1 in this sub-step (A3-6) is preferably equal to desorption strength of the eluent passing through the section 1 in the sub-step (A2-6).

As an example of the sub-step (A1-6), a sub-step of carrying out the following sub-step (A1-6ex) is mentioned, but the sub-step (A1-6) is not limited to the sub-step (A1-6ex).
<Sub-Step (A1-6ex)>
An eluent d2 having the second strongest desorption strength of four kinds of eluents is supplied from an eluent supply port D2 while an upstream end of the section 1 is used as the eluent supply port D2, an intermediately adsorptive fraction is extracted from an intermediately adsorptive fraction extraction port B while a downstream end of the section 3 is used as the extraction port B, an eluent d4 having the third strongest desorption strength of the four kinds of eluents is supplied from an eluent supply port D4 while an upstream end of the section 4 is used as the eluent supply port D4, and a weakly adsorptive fraction is extracted from a weakly adsorptive fraction extraction port A while a downstream end of the section 5 is used as the extraction port A.

As an example of the sub-step (A2-6), a sub-step of carrying out the following sub-step (A2-6ex) is mentioned, but the sub-step (A2-6) is not limited to the sub-step (A2-6ex).
<Sub-Step (A2-6ex)>
An eluent d1 having the strongest desorption strength of four kinds of eluents is supplied from an eluent supply port D1 while an upstream end of the section 1 is used as the eluent supply port D1, a strongly adsorptive fraction is extracted from the strongly adsorptive fraction extraction port C while a downstream end of the section 1 is used as the extraction port C, a feed solution is supplied from the feed solution supply port F while an upstream end of the section 3 is used as the feed solution supply port F, an eluent d3 having the weakest desorption strength of the four kinds of eluents is supplied from an eluent supply port D3 while an upstream end of the section 4 is used as the eluent supply port D3, and a weakly adsorptive fraction is extracted from the weakly adsorptive fraction extraction port A.

As an example of the sub-step (A3-6), a sub-step of carrying out the following sub-step (A3-6ex) is mentioned, but the sub-step (A3-6) is not limited to the sub-step (A3-6ex).
<Sub-Step (A3-6ex)>
The eluent d1 is supplied from the eluent supply port D1, a strongly adsorptive fraction is extracted from the strongly adsorptive fraction extraction port C, the eluent d2 is supplied from an eluent supply port D2 while an upstream end of the section 2 is used as the eluent supply port D2, the eluent d3 is supplied the eluent supply port D3, and a weakly adsorptive fraction is extracted from the weakly adsorptive fraction extraction port A.

Figure 15:
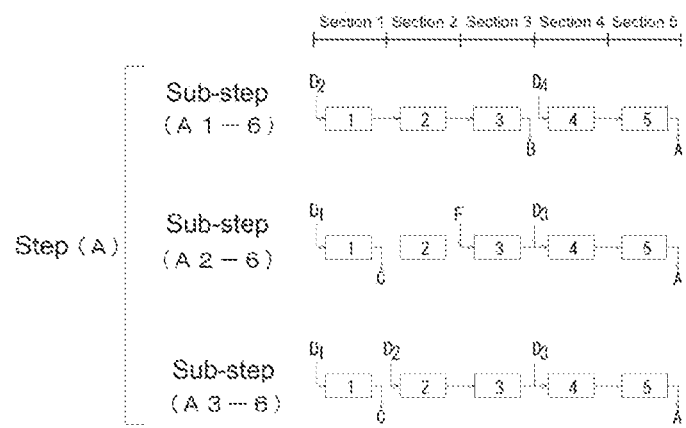
FIG. 15 is a flow diagram of respective sub-steps constituting step (A) in still another embodiment of the simulated moving-bed type chromatographic separation method of the present invention.

A case where each section has one unit packed column is used as an example, and a flow diagram in a case where the sub-steps (A1-6ex), (A2-6ex), and (A3-6ex) are sequentially performed in the step (A) is illustrated in FIG. 15. In FIG. 15, a square enclosure indicates one unit packed column, and the number in the enclosure indicates the number of the unit packed column.

Figure 16:
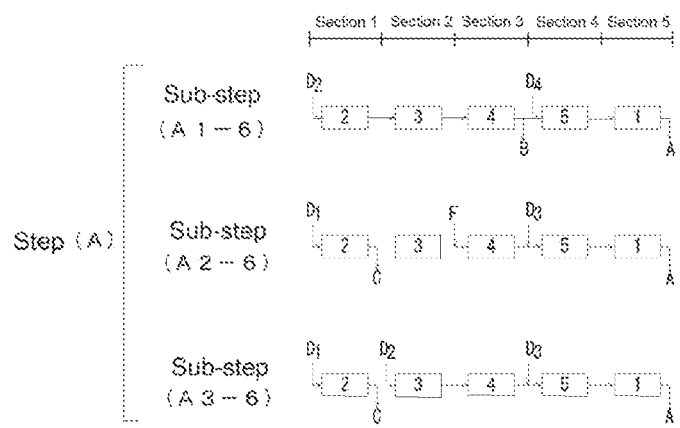
FIG. 16 is a flow diagram of respective sub-steps constituting step (A) after the step (A) illustrated in FIG. 15 is finished and then step (B) is carried out.

After the step (A) in which the sub-steps (A1-6ex), (A2-6ex), and (A3-6ex) are sequentially performed, the feed solution supply port F, the eluent supply port D, the weakly adsorptive fraction extraction port A, the intermediately adsorptive fraction extraction port B, and the strongly adsorptive fraction extraction port C are shifted to the downstream side, while maintaining a relative positional relationship therebetween, by the step (B), and then the sub-steps (A1-6ex), (A2-6ex), and (A3-6ex) are sequentially performed. The flow diagram in this case is illustrated in FIG. 16. The unit packed column arranged in each section illustrated in FIG. 15 is shifted to the downstream side one by one in FIG. 16. In this case, a process in which the step (A) illustrated in FIG. 15 is started and then the step (B) is performed is designated as one set, this process is performed at five sets, and it returns to the embodiment illustrated in FIG. 15 again.

Embodiment 7

In Embodiment 7, a circulation system having five or more unit packed columns is used. Here, it is assumed that this circulation system is divided into five sections 1 to 5 that are annularly continuous from the upstream side to the downstream side such that each section has at least one unit packed column. Further, as the eluent, four kinds of eluents d-I to d-IV each having different desorption strength are used.

In this Embodiment 7, the following sub-steps (A1-7), (A2-7), and (A3-7) are sequentially performed as the step (A).
<Sub-Step (A1-7)>
An eluent d-I is supplied from an eluent supply port D-I while an upstream end of the section 1 is used as the eluent supply port D-I, a strongly adsorptive fraction is extracted from a strongly adsorptive fraction extraction port C while a downstream end of the section 1 is used as the extraction port C, a feed solution is supplied from a feed solution supply port F while an upstream end of the section 3 is used as the feed solution supply port F, an eluent d-III is supplied from an eluent supply port D-III while an upstream end of the section 4 is used as the eluent supply port D-III, and a weakly adsorptive fraction is extracted from the extraction port A while a downstream end of the section 5 is used as the extraction port A, thereby most strengthening desorption strength of the eluent passing through the section 1, weakening desorption strength of the eluent passing through the section 3 more than desorption strength of the eluent passing through the section 1, and weakening desorption strength of the eluent passing through the sections 4 and 5 more than desorption strength of the eluent passing through the section 3.
<Sub-Step (A2-7)>
The eluent d-I is supplied from the eluent supply port D-I, a strongly adsorptive fraction is extracted from the extraction port C, the eluent d-II is supplied from the eluent supply port D-II while an upstream end of the section 2 is used as the eluent supply port D-II, the eluent d-III is supplied from the eluent supply port D-III, and a weakly adsorptive fraction is extracted from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3.
<Sub-Step (A3-7)>
The eluent d-I is supplied from the eluent supply port D-I, a strongly adsorptive fraction is extracted from the extraction port C, the eluent d-II is supplied from the eluent supply port D-II, an intermediately adsorptive fraction is extracted from an intermediately adsorptive fraction extraction port B while a downstream end of the section 4 is used as the extraction port B, an eluent d-IV is supplied from an eluent supply port D-IV while an upstream end of the section 5 is used as the eluent supply port D-IV, and a weakly adsorptive fraction is extracted from the extraction port A, thereby most strengthening desorption strength of the eluent passing through the section 1, weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

As an example of the sub-step (A1-7), a sub-step of carrying out the following sub-step (A1-7ex) is mentioned, but the sub-step (A1-7) is not limited to the sub-step (A1-7ex).

<Sub-Step (A1-7ex)>

An eluent d1 having the strongest desorption strength of four kinds of eluents is supplied from an eluent supply port D1 while an upstream end of the section 1 is used as the eluent supply port D1, a strongly adsorptive fraction is extracted from the strongly adsorptive fraction extraction port C while a downstream end of the section 1 is used as the extraction port C, a feed solution is supplied from the feed solution supply port F while an upstream end of the section 3 is used as the feed solution supply port F, an eluent d3 having the weakest desorption strength of the four kinds of eluents is supplied from an eluent supply port D3 while an upstream end of the section 4 is used as the eluent supply port D3, and a weakly adsorptive fraction is extracted from the weakly adsorptive fraction extraction port A while a downstream end of the section 5 is used as the extraction port A.

As an example of the sub-step (A2-7), a sub-step of carrying out the following sub-step (A2-7ex) is mentioned, but the sub-step (A2-7) is not limited to the sub-step (A2-7ex).

<Sub-Step (A2-7ex)>

The eluent d1 is supplied from the eluent supply port D1, a strongly adsorptive fraction is extracted from the strongly adsorptive fraction extraction port C, the eluent d3 is supplied from the eluent supply port D3, and a weakly adsorptive fraction is extracted from the weakly adsorptive fraction extraction port A.

As an example of the sub-step (A3-7), a sub-step of carrying out the following sub-step (A3-7ex) is mentioned, but the sub-step (A3-7) is not limited to the sub-step (A3-7ex).

<Sub-Step (A3-7ex)>

The eluent d1 is supplied from the eluent supply port D1, a strongly adsorptive fraction is extracted from the strongly adsorptive fraction extraction port C, the eluent d2 is supplied from the eluent supply port D2, an intermediately adsorptive fraction is extracted from an intermediately adsorptive fraction extraction port B while a downstream end of the section 4 is used as the extraction port B, an eluent d4 having the third strongest desorption strength of four kinds of eluents from an eluent supply port D4 while an upstream end of the section 5 is used as the eluent supply port D4, and a weakly adsorptive fraction is extracted from the weakly adsorptive fraction extraction port A.

Figure 17:
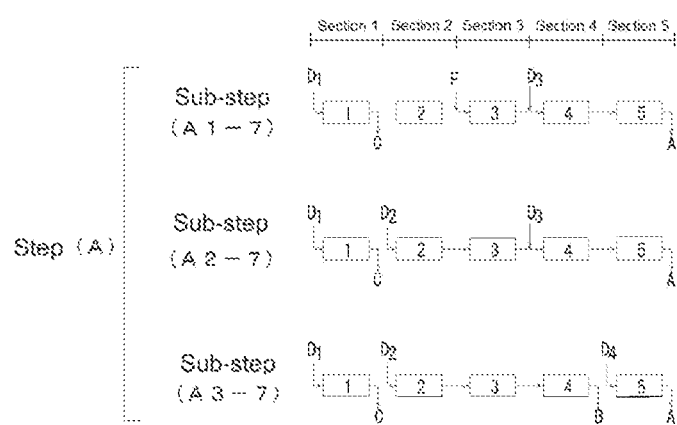
FIG. 17 is a flow diagram of respective sub-steps constituting step (A) in still another embodiment of the simulated moving-bed type chromatographic separation method of the present invention.

A case where each section has one unit packed column is used as an example, and a flow diagram in a case where the sub-steps (A1-7ex), (A2-7ex), and (A3-7ex) are sequentially performed in the step (A) is illustrated in FIG. 17. In FIG. 17, a square enclosure indicates one unit packed column, and the number in the enclosure indicates the number of the unit packed column.

Figure 18:
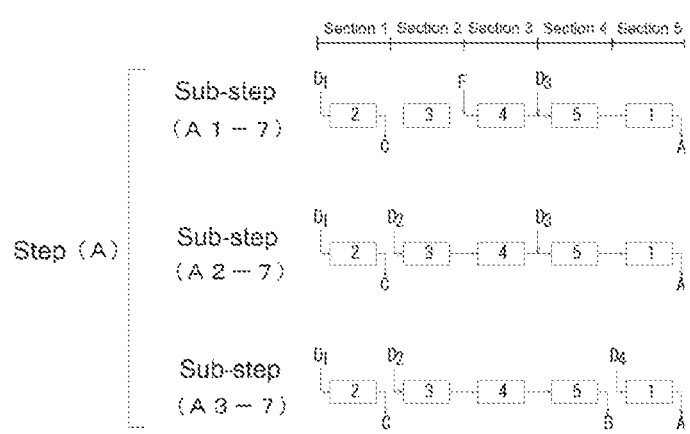
FIG. 18 is a flow diagram of respective sub-steps constituting step (A) after the step (A) illustrated in FIG. 17 is finished and then step (B) is carried out.

After the step (A) in which the sub-steps (A1-7ex), (A2-7ex), and (A3-7ex) are sequentially performed, the feed solution supply port F, the eluent supply port D, the weakly adsorptive fraction extraction port A, the intermediately adsorptive fraction extraction port B, and the strongly adsorptive fraction extraction port C are shifted to the downstream side, while maintaining a relative positional relationship therebetween, by the step (B), and then the sub-steps (A1-7ex), (A2-7ex), and (A3-7ex) are sequentially performed. The flow diagram in this case is illustrated in FIG. 18. The unit packed column arranged in each section illustrated in FIG. 17 is shifted to the downstream side one by one in FIG. 18. In this case, a process in which the step (A) illustrated in FIG. 17 is started and then the step (B) is performed is designated as one set, this process is performed at five sets, and it returns to the embodiment illustrated in FIG. 17 again.

In the method of the present invention, supply of a target liquid to a target place or extraction of a target liquid from a target extraction place can be performed by appropriately adjusting the operation of a pump at each place and opening/closing of a valve at each place which are provided in a circulation system. That is, methods of supplying a target fluid and extracting a target fraction in a circulation system are publicly known. Furthermore, the supply flow rate and the extraction flow rate of each liquid can also be appropriately set depending on purposes such as treatment efficiency.

In the method of the present invention, a purification target component may be any one of a strongly adsorptive component, an intermediately adsorptive component, and a weakly adsorptive component, and in particular, the method of the present invention is a suitable method for purifying an intermediately adsorptive component. The method of the present invention can be suitably used for purification of protein. Since an intermediately adsorptive component can be obtained at a high purity by the method of the present invention, the method of the present invention is a suitable method for obtaining a target protein from a feed solution containing a target protein as well as digest or aggregate thereof.

The protein is not particularly limited, and for example, an antibody can be used as a purification target component. In the present invention, the "antibody" may be a naturally occurring antibody, a chimeric antibody, and an antibody fragmented by an enzyme or the like (for example, F(ab')2 fragment, Fab' fragment, or Fab fragment). Furthermore, a single-stranded antibody and dimers (diabodies), trimers (triabodies), or minibodies thereof are also included. Furthermore, the antibody may be a single domain antibody. Incidentally, these are merely examples, all of proteins having a specific binding ability with respect to antigens and derivatives thereof are included in the concept of the antibody in the present invention.

An antibody highly purified by the method of the present invention can be applied as an antibody drug. That is, an antibody contained in a feed solution is fractionated by applying the method of the present invention, so that a method for producing an antibody drug can be provided.

More specifically, according to the method of the present invention, an antibody drug can be obtained by using a culture solution of antibody producing cells and/or an extract of antibody producing cells as a feed solution and fractionating an antibody contained in the feed solution. In the present invention, the meaning of the term "culture solution of antibody producing cells" or "extract of antibody producing cells" includes a state where the culture solution of antibody producing cells or the extract of antibody producing cells is subjected to various treatments such as a centrifugal separation treatment and a chromatographic separation treatment to be fractionated, purified, etc. to some extent.

In the method of the present invention, an adsorbent to be packed in the unit packed column is appropriately selected according to a purification target component, and various adsorbents can be adopted. For example, a strongly acidic cation-exchange resin, a weakly acidic cation-exchange resin, a strongly basic anion-exchange resin, a weakly basic anion-exchange resin, a synthetic adsorbent, zeolite, silica gel, functional group-modified silica gel (preferably octadecylsilyl-modified silica gel), other materials for gel filtration chromatography, or an affinity adsorbent can be used as the adsorbent.

In a case where a purification target component is protein, the adsorbent is preferably an ion-exchange resin. In particular, a cation-exchange resin can be suitably used.

The simulated moving-bed type chromatographic separation system of the present invention is a system for carrying out the method of the present invention. That is, the simulated moving-bed type chromatographic separation system of the present invention is a system having the configuration of the circulation system described above in which the circulation system can sequentially repeat the operation of the step (A) and the operation of the step (B) described above.

EXAMPLES

Hereinafter, the present invention will be described in more detail on the basis of Examples; however, the present invention is not limited to the following Examples.
[Preparation of Feed Solution]
Cells producing immune globulin G2 (IgG2) of human being were cultivated, the supernatant of the culture solution thereof was desalinated by dialysis, and the salt concentration was adjusted by addition of NaCl to obtain a feed solution. The contents of the antibody contained in this supernatant, fragments and aggregate thereof are as described below. In the following table, the fragment 1 was set as protein contained in the fraction having a peak near a molecular weight of 5000 and having a molecular weight of less than 25000, and the fragment 2 was set as protein contained in the fraction having a molecular weight of 25000 or more and less than 50000. Furthermore, the antibody was set as protein contained in the fraction having a peak near a molecular weight of 150000 and having a molecular weight of 50000 or more and less than 300000. Furthermore, the aggregate was set as protein contained in the fraction having a molecular weight of 300000 or more. The component compositions described below were determined by high-performance liquid chromatography (HPLC) using an analytical column (Tosoh Corporation TSKgel G3000SWXL).

TABLE 1

| Component in supernatant of culture medium | Concentration (g/L) |
| --- | --- |
| Fragment 1 | 0.02 |
| Fragment 2 | 0.326 |
| Antibody | 1.564 |
| Aggregate | 0.090 |

[Adsorbent Used in Unit Packed Column (Column)]
A cation exchange resin (trade name: Fractogel (registered trademark) EMD $SO_3^-$ (M), manufactured by Merck KGaA, Darmstadt, Germany) was used as the adsorbent.
[Eluent]
Phosphate buffer solutions having various NaCl concentrations were prepared by using the following A liquid and B liquid and were used as the eluent.
<A Liquid>
20 mM of phosphate buffer pH 6.0
<B Liquid>
20 mM of phosphate buffer containing NaCl at a concentration of 0.3 M (17.53 g/L) pH 6.0

[Comparative Example 1] Single Column Step Gradient

<Column>
One column having a size of an inner diameter of 10 mm×a length of 100 mm
<Feed Solution>
The NaCl concentration in the feed solution was set to 2.05 g/L.
<Eluent>
The following eluents were used.

TABLE 2

| Eluent type | NaCl concentration (g/L) of eluent |
| --- | --- |
| D1 | 2.39 |
| D2 | 2.66 |
| D3 | 17.53 |

Figure 10:
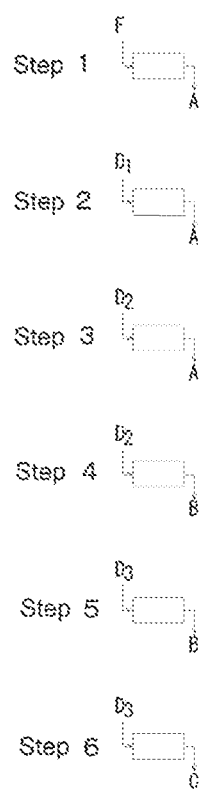
FIG. 10 is a flow diagram illustrating a single column step gradient operation process in Comparative Examples 1 and 2.

<Operation Conditions>
The following processes 1 to 6 were sequentially performed. The flow diagram of the processes 1 to 6 is illustrated in FIG. 10.

The following operation conditions were set such that the recovery percentages for the fragment 1 and the fragment 2 into the weakly adsorptive fraction became 98% or more, the recovery percentage for the antibody into the intermediately adsorptive fraction became 98% or more, and the recovery percentage for the aggregate into the strongly adsorptive fraction became 98% or more. This is also the same in each of Comparative Examples and Examples described below.

TABLE 3

| Process | Time (min) | Flow velocity (mL/min) |
| --- | --- | --- |
| 1 | 5.03 | 9.11 |
| 2 | 8.50 | 9.11 |
| 3 | 0.71 | 9.11 |
| 4 | 39.46 | 9.11 |
| 5 | 0.66 | 9.11 |
| 6 | 3.60 | 9.11 |

<Result>

—Recovery Percentage—

The recovery percentages for the fragment 1 and the fragment 2 into the weakly adsorptive fraction, the recovery percentage for the antibody into the intermediately adsorptive fraction, and the recovery percentage for the aggregate into the strongly adsorptive fraction are shown in the following table. This recovery percentage is calculated by 100×[Mass in the fraction]/[Mass in the feed solution].

TABLE 4

| Fraction | Recovered component | Recovery percentage (%) |
| --- | --- | --- |
| Weakly adsorptive fraction | Fragment 1 | Over 99 |
|  | Fragment 2 | 98.2 |
| Intermediately adsorptive fraction | Antibody | 98.0 |
| Strongly adsorptive fraction | Aggregate | 98.0 |

—Separation Treatment Efficiency—

The treated amount (unit: "L (liter)-feed solution" of the feed solution per volume (unit: "L (liter)-R", R is an abbreviation for Resin) of the adsorbent and per time (unit: "h (hour))" was designated as the separation treatment efficiency. Incidentally, in the multi-column system using a plurality of columns described below, the volume of the adsorbent is the total amount of adsorbents contained in all of the columns.

The separation treatment efficiency in Comparative Example 1 was 6.04 (L-feed solution)/(L−R)·h.

[Comparative Example 2] Single Column Step Gradient

<Column>

One column having a size of an inner diameter of 10 mm×a length of 400 mm

<Feed Solution>

The NaCl concentration in the feed solution was set to 2.05 g/L.

<Eluent>

The following eluents were used.

TABLE 5

| Eluent type | NaCl concentration (g/L) of eluent |
| --- | --- |
| D1 | 2.35 |
| D2 | 2.62 |
| D3 | 17.53 |

<Operation Conditions>

The following processes 1 to 6 were sequentially performed. The flow diagram of the processes 1 to 6 is as illustrated in FIG. 10.

TABLE 6

| Process | Time (min) | Flow velocity (mL/min) |
| --- | --- | --- |
| 1 | 5.99 | 43.3 |
| 2 | 6.35 | 43.3 |
| 3 | 0.63 | 43.3 |
| 4 | 22.48 | 43.3 |
| 5 | 0.58 | 43.3 |
| 6 | 3.55 | 43.3 |

<Result>

—Recovery Percentage—

The recovery percentages for the fragment 1 and the fragment 2 into the weakly adsorptive fraction, the recovery percentage for the antibody into the intermediately adsorptive fraction, and the recovery percentage for the aggregate into the strongly adsorptive fraction are shown in the following table.

TABLE 7

| Fraction | Recovered component | Recovery percentage (%) |
| --- | --- | --- |
| Weakly adsorptive fraction | Fragment 1 | Over 99 |
|  | Fragment 2 | 98.0 |
| Intermediately adsorptive fraction | Antibody | 98.0 |
| Strongly adsorptive fraction | Aggregate | 98.0 |

—Separation Treatment Efficiency—

The separation treatment efficiency in Comparative Example 2 was 12.51 (L-feed solution)/(L−R)·h.

[Comparative Example 3] Multi-Column Gradient Simulated Moving-Bed Type

<Column>

Four columns having a size of an inner diameter of 10 mm×a length of 100 mm

<Feed Solution>

The NaCl concentration in the feed solution was set to 2.23 g/L.

<Eluent>

The following eluents were used.

TABLE 8

| Eluent type | NaCl concentration (g/L) of eluent |
| --- | --- |
| D1 | 17.53 |
| D2 | 2.28 |
| D3 | 2.23 |

<Operation Conditions>

Figure 11:
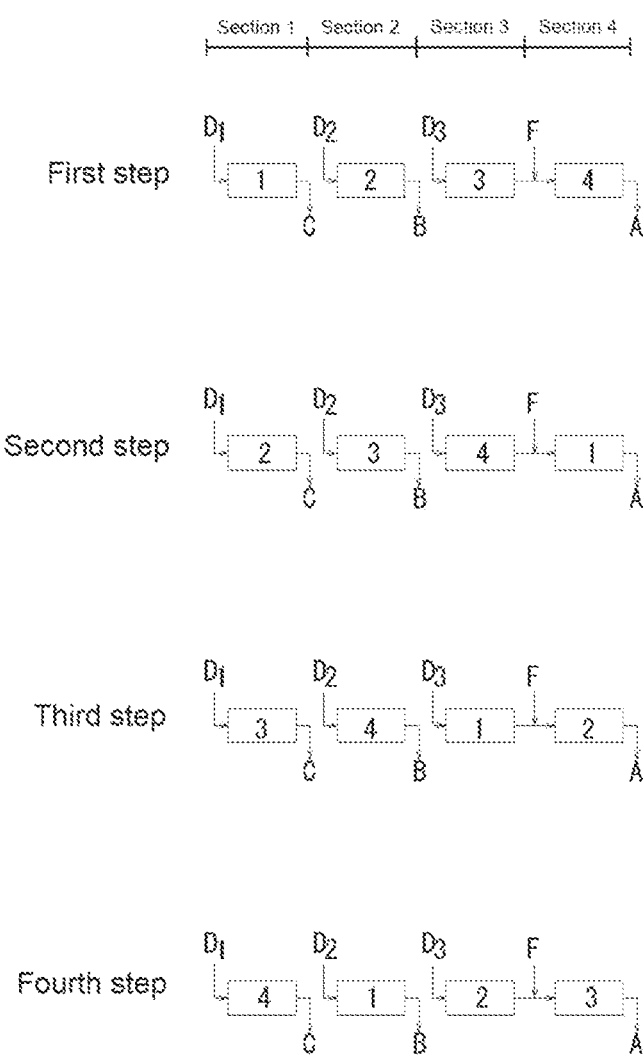
FIG. 11 is a flow diagram illustrating an operation process of simulated moving-phase type chromatographic separation in Comparative Example 3.

A flow diagram of operation of Comparative Example 3 is illustrated in FIG. 11. The first to fourth steps illustrated in FIG. 11 were set as one cycle and 10 cycles were carried out. A step of shifting the feed solution supply port F, the eluent supply port D (D1 to D3), the weakly adsorptive fraction extraction port A, the intermediately adsorptive fraction extraction port B, and the strongly adsorptive fraction extraction port C to the downstream side by one column while maintaining the relative positional relationships thereof is performed between the respective steps.

Incidentally, the first to fourth steps illustrated in FIG. 11 correspond to the step (A) of the present invention, but are different from the step (A) and are not configured by a plurality of sub-steps (in other words, one step is configured by one sub-step). All of "D1", "D2", and "D3" in FIG. 11 are eluent supply ports, and the eluents D1, D2, and D3 are supplied thereto, respectively. "C" in FIG. 11 indicates a strongly adsorptive fraction extraction port and a strongly adsorptive fraction is extracted therefrom. Similarly, "B" indicates an intermediately adsorptive fraction extraction port and an intermediately adsorptive fraction is extracted therefrom, and "A" indicates a weakly adsorptive fraction extraction port and a weakly adsorptive fraction is extracted therefrom.

The supply flow velocities of the eluents (D1 to D3) and the feed solution (F) in each step illustrated in FIG. 11 are set as described below. Incidentally, although the flow velocity of the liquid to be extracted is not described in the following table, the flow velocity of the strongly adsorptive fraction extracted from the strongly adsorptive fraction extraction port C is the same as the flow velocity of the eluent D1 supplied. Furthermore, the flow velocity of the intermediately adsorptive fraction extracted from the intermediately adsorptive fraction extraction port B is the same as the flow velocity of the eluent D2 supplied. Furthermore, the flow velocity of the weakly adsorptive fraction extracted from the weakly adsorptive fraction extraction port A is the total of the flow velocity of the eluent D3 supplied and the flow velocity of the feed solution supplied from the feed solution supply port F. That is, the supply flow rate and the extraction flow rate are the same at all times, and the same applies to Comparative Examples and Examples described below.

TABLE 9

| Time (min) of one step | Flow velocity (mL/min) | | | |
| --- | --- | --- | --- | --- |
|  | D1 | D2 | D3 | F |
| 29.9 | 2.14 | 18.7 | 1.79 | 3.73 |

<Result>
—Recovery Percentage—

The recovery percentages for the fragment 1 and the fragment 2 into the weakly adsorptive fraction, the recovery percentage for the antibody into the intermediately adsorptive fraction, and the recovery percentage for the aggregate into the strongly adsorptive fraction are shown in the following table.

TABLE 10

| Fraction | Recovered component | Recovery percentage (%) |
| --- | --- | --- |
| Weakly adsorptive fraction | Fragment 1 | Over 99 |
|  | Fragment 2 | Over 99 |
| Intermediately adsorptive fraction | Antibody | 98.0 |
| Strongly adsorptive fraction | Aggregate | 98.0 |

—Separation Treatment Efficiency—

The separation treatment efficiency in Comparative Example 3 was 7.11 (L-feed solution)/(L–R)·h.

[Comparative Example 4] Multi-Column Gradient Simulated Moving-Bed Type

<Column>
Four columns having a size of an inner diameter of 10 mm×a length of 100 mm
<Feed Solution>
The NaCl concentration in the feed solution was set to 2.24 g/L.
<Eluent>
The following eluents were used.

TABLE 11

| Eluent type | NaCl concentration (g/L) of eluent |
| --- | --- |
| D1 | 17.53 |
| D2 | 2.26 |
| D3 | 2.24 |

<Operation Conditions>

Figure 12:
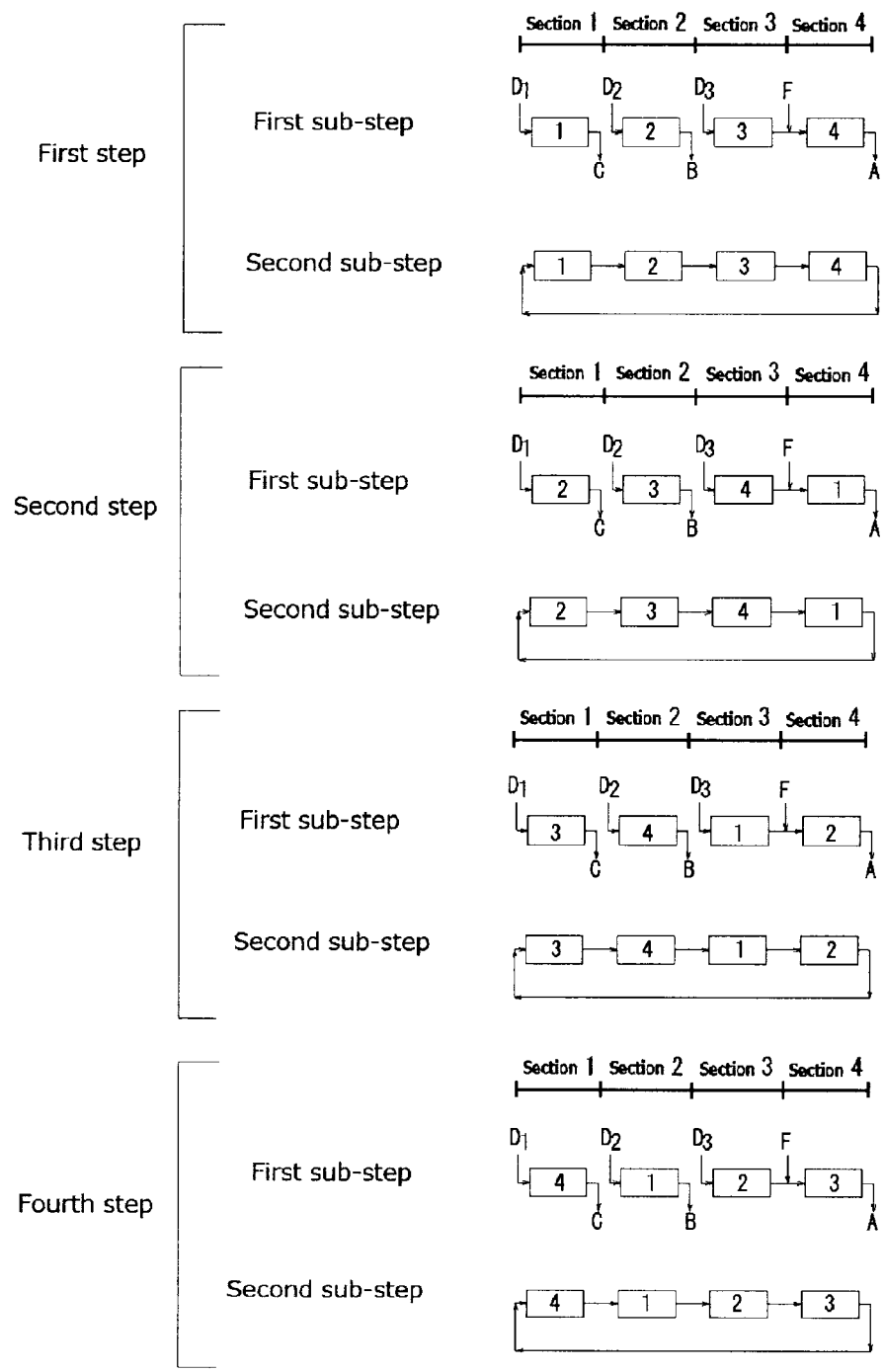
FIG. 12 is a flow diagram illustrating an operation process of simulated moving-phase type chromatographic separation in Comparative Example 4.

A flow diagram of operation of Comparative Example 4 is illustrated in FIG. 12. The first to fourth steps illustrated in FIG. 12 were set as one cycle and 10 cycles were carried out. Incidentally, respective steps illustrated in FIG. 12 is configured by two sub-steps of a first sub-step and a second sub-step, the second sub-step is not to perform supplying and extracting of a liquid but is to circulate a fluid in the circulation system.

The supply flow velocities of the eluents (D1 to D3) and the feed solution (F) in each step illustrated in FIG. 12 are set as described below.

TABLE 12

| Time (min) of sub-step | Flow velocity (mL/min) | | | | |
| --- | --- | --- | --- | --- | --- |
|  |  | D1 | D2 | D3 | F |
| First sub-step | 32.7 | 1.90 | 17.4 | 1.33 | 3.82 |
| Second sub-step | 0.48 | Circulation 0.94 | | | |

<Result>
—Recovery Percentage—

The recovery percentages for the fragments 1 and 2 into the weakly adsorptive fraction, the recovery percentage for the antibody into the intermediately adsorptive fraction, and the recovery percentage for the aggregate into the strongly adsorptive fraction are shown in the following table.

TABLE 13

| Fraction | Recovered component | Recovery percentage (%) |
| --- | --- | --- |
| Weakly adsorptive fraction | Fragment 1 | Over 99 |
|  | Fragment 2 | Over 99 |
| Intermediately adsorptive fraction | Antibody | 98.0 |
| Strongly adsorptive fraction | Aggregate | 98.0 |

—Separation Treatment Efficiency—

The separation treatment efficiency in Comparative Example 4 was 7.19 (L-feed solution)/(L–R)·h.

[Example 1] Multi-Column Gradient Simulated Moving-Bed Type

<Column>
Four columns having a size of an inner diameter of 10 mm×a length of 100 mm
<Feed Solution>
The NaCl concentration in the feed solution was set to 1.93 g/L.
<Eluent>
The following eluents were used.

TABLE 14

| Eluent type | NaCl concentration (g/L) of eluent |
| --- | --- |
| D1 | 17.53 |
| D2 | 3.59 |
| D3 | 1.93 |
| D4 | 2.21 |

<Operation Conditions>

The step (A) was configured by the combination of sub-steps illustrated in FIG. 2. This step (A) and the step (B) subsequent thereto were regarded as one set, and this one set was performed at four times and regarded as one cycle, and 10 cycles were performed. The flow velocities of the eluents (D1 to D4) and the feed solution (F) supplied in each step (A) were set as described below.

TABLE 15

| | Time (min) of sub-step | Flow velocity (mL/min) | | | |
|---|---|---|---|---|---|
| Sub-step (A1-1) | 4.93 | D1 10.76 | D2 4.41 | | F 21.77 |
| Sub-step (A2-1) | 1.73 | D1 10.76 | D2 4.41 | D3 21.77 | |
| Sub-step (A3-1) | 3.75 | D1 13.87 | D2 5.62 | D4 15.21 | |

<Result>
—Recovery Percentage—

The recovery percentages for the fragments 1 and 2 into the weakly adsorptive fraction, the recovery percentage for the antibody into the intermediately adsorptive fraction, and the recovery percentage for the aggregate into the strongly adsorptive fraction are shown in the following table.

TABLE 16

| Fraction | Recovered component | Recovery percentage (%) |
|---|---|---|
| Weakly adsorptive fraction | Fragment 1 | Over 99 |
| | Fragment 2 | 98.0 |
| Intermediately adsorptive fraction | Antibody | 98.0 |
| Strongly adsorptive fraction | Aggregate | 98.0 |

—Separation Treatment Efficiency—

The separation treatment efficiency in Example 1 was 19.696 (L-feed solution)/(L–R)·h.

[Example 2] Multi-Column Gradient Simulated Moving-Bed Type

<Column>

Four columns having a size of an inner diameter of 10 mm×a length of 100 mm

<Feed Solution>

The NaCl concentration in the feed solution was set to 2.02 g/L.

<Eluent>

The following eluents were used.

TABLE 17

| Eluent type | NaCl concentration (g/L) of eluent |
|---|---|
| D1 | 17.53 |
| D2 | 3.57 |
| D3 | 2.02 |
| D4 | 2.21 |

<Operation Conditions>

The step (A) was configured by the combination of sub-steps illustrated in FIG. 4. This step (A) and the step (B) subsequent thereto were regarded as one set, and this one set was performed at four times and regarded as one cycle, and 10 cycles were performed. The flow velocities of the eluents (D1 to D4) and the feed solution (F) supplied in each step (A) were set as described below.

TABLE 18

| | Time (min) of sub-step | Flow velocity (mL/min) | | | |
|---|---|---|---|---|---|
| Sub-step (A1-2) | 6.82 | | D2 2.39 | | F 17.65 |
| Sub-step (A2-2) | 1.67 | D1 3.25 | D2 2.39 | D3 17.65 | |
| Sub-step (A3-2) | 3.86 | D1 7.80 | D2 5.38 | | D4 7.37 |

<Result>
—Recovery Percentage—

The recovery percentages for the fragments 1 and 2 into the weakly adsorptive fraction, the recovery percentage for the antibody into the intermediately adsorptive fraction, and the recovery percentage for the aggregate into the strongly adsorptive fraction are shown in the following table.

TABLE 19

| Fraction | Recovered component | Recovery percentage (%) |
|---|---|---|
| Weakly adsorptive fraction | Fragment 1 | Over 99 |
| | Fragment 2 | 98.0 |
| Intermediately adsorptive fraction | Antibody | 98.0 |
| Strongly adsorptive fraction | Aggregate | 98.0 |

—Separation Treatment Efficiency—

The separation treatment efficiency in Example 2 was 18.610 (L-feed solution)/(L–R)·h.

[Example 3] Multi-Column Gradient Simulated Moving-Bed Type

<Column>

Five columns having a size of an inner diameter of 10 mm×a length of 805 mm

<Feed Solution>

The NaCl concentration in the feed solution was set to 2.46 g/L.

<Eluent>

The following eluents were used.

TABLE 20

| Eluent type | NaCl concentration (g/L) of eluent |
|---|---|
| D1 | 17.53 |
| D2 | 2.46 |
| D3 | 0.00 |
| D4 | 1.98 |

<Operation Conditions>

The step (A) was configured by the combination of sub-steps illustrated in FIG. 6. This step (A) and the step (B) subsequent thereto were regarded as one set, and this one set was performed at five times and regarded as one cycle, and 10 cycles were performed. The flow velocities of the eluents (D1 to D4) and the feed solution (F) supplied in each step (A) were set as described below.

TABLE 21

| Sub-step | Time (min) of sub-step | Flow velocity (mL/min) | | | |
|---|---|---|---|---|---|
| | | D1 | D2 | D3 | F |
| Sub-step (A1-3) | 10.39 | | 0.003 | 4.56 | 18.54 |
| Sub-step (A2-3) | 3.66 | 2.90 | 8.95 | 2.20 | |
| Sub-step (A3-3) | 8.25 | 2.49 | 21.42 | D4 2.03 | |

<Result>
—Recovery Percentage—

The recovery percentages for the fragments 1 and 2 into the weakly adsorptive fraction, the recovery percentage for the antibody into the intermediately adsorptive fraction, and the recovery percentage for the aggregate into the strongly adsorptive fraction are shown in the following table.

TABLE 22

| Fraction | Recovered component | Recovery percentage (%) |
|---|---|---|
| Weakly adsorptive fraction | Fragment 1 | Over 99 |
| | Fragment 2 | 98.0 |
| Intermediately adsorptive fraction | Antibody | 98.0 |
| Strongly adsorptive fraction | Aggregate | 98.0 |

—Separation Treatment Efficiency—

The separation treatment efficiency in Example 3 was 16.499 (L-feed solution)/(L–R)·h.

[Example 4] Multi-Column Gradient Simulated Moving-Bed Type

<Column>
Seven columns having a size of an inner diameter of 10 mm×a length of 100 mm
<Feed Solution>
The NaCl concentration in the feed solution was set to 2.57 g/L.
<Eluent>
The following eluents were used.

TABLE 23

| Eluent type | NaCl concentration (g/L) of eluent |
|---|---|
| D1 | 17.53 |
| D2 | 2.57 |
| D3 | 0.00 |
| D4 | 0.37 |
| D5 | 1.80 |

<Operation Conditions>
The step (A) was configured by the combination of sub-steps illustrated in FIG. 8. This step (A) and the step (B) subsequent thereto were regarded as one set, and this one set was performed at seven times and regarded as one cycle, and 10 cycles were performed. The flow velocities of the eluents (D1 to D5) and the feed solution (F) supplied in each step (A) were set as described below.

TABLE 24

| Sub-step | Time (min) of one step | Flow velocity (mL/min) | | | |
|---|---|---|---|---|---|
| | | D2 | D3 | | F |
| Sub-step (A1-4) | 8.18 | 0.004 | 6.86 | | 16.07 |

TABLE 24-continued

| Sub-step | Time (min) of one step | Flow velocity (mL/min) | | | |
|---|---|---|---|---|---|
| | | D1 | D2 | D4 | |
| Sub-step (A2-4) | 3.84 | 2.94 | 10.68 | 5.73 | |
| | | D1 | D2 | | D5 |
| Sub-step (A3-4) | 4.47 | 3.43 | 19.02 | | 2.18 |

<Result>
—Recovery Percentage—

The recovery percentages for the fragments 1 and 2 into the weakly adsorptive fraction, the recovery percentage for the antibody into the intermediately adsorptive fraction, and the recovery percentage for the aggregate into the strongly adsorptive fraction are shown in the following table.

TABLE 25

| Fraction | Recovered component | Recovery percentage (%) |
|---|---|---|
| Weakly adsorptive fraction | Fragment 1 | Over 99 |
| | Fragment 2 | 98.0 |
| Intermediately adsorptive fraction | Antibody | 98.0 |
| Strongly adsorptive fraction | Aggregate | 98.0 |

—Separation Treatment Efficiency—

The separation treatment efficiency in Example 4 was 15.225 (L-feed solution)/(L–R)·h.

As described above, it is found that, in the simulated moving-bed type chromatographic separation, a weakly adsorptive component, a strongly adsorptive component, and an intermediately adsorptive component can be sufficiently highly purified and fractionated with a smaller amount of the adsorbent used by using two or more kinds of eluents and setting the positional relationship between the weakly adsorptive fraction extraction port A, the intermediately adsorptive fraction extraction port B, the strongly adsorptive fraction extraction port C, and the feed solution supply port F in the circulation system to a specified relationship defined in the present invention. Based on the present example, it is shown that a target antibody is obtainable at a high purity and with high efficiency in an intermediately adsorptive fraction.

[Example 5] Multi-Column Gradient Simulated Moving-Bed Type

<Column>
Five columns having a size of an inner diameter of 10 mm×a length of 80 mm
<Feed Solution>
The NaCl concentration in the feed solution was set to 2.46 g/L.
<Eluent>
The following eluents were used.

TABLE 26

| Eluent type | NaCl concentration (g/L) of eluent |
|---|---|
| D1 | 17.53 |
| D2 | 2.46 |
| D3 | 0.00 |
| D4 | 1.98 |

The step (A) was configured by the combination of sub-steps illustrated in FIG. 13. This step (A) and the step (B) subsequent thereto were regarded as one set, and this one set was performed at five times and regarded as one cycle, and 10 cycles were performed. The flow velocities of the eluents (D1 to D4) and the feed solution (F) supplied in each step (A) were set as described below.

TABLE 27

| | Time (min) of one step | | Flow velocity (mL/min) | | |
|---|---|---|---|---|---|
| Sub-step (A1-5) | 10.39 | | | D3 4.56 | F 18.54 |
| Sub-step (A2-5) | 3.66 | D1 2.90 | D2 8.95 | D3 2.20 | |
| Sub-step (A3-5) | 8.25 | D1 2.49 | D2 21.42 | | D4 2.03 |

<Result>
—Recovery Percentage—

The recovery percentages for the fragments 1 and 2 into the weakly adsorptive fraction, the recovery percentage for the antibody into the intermediately adsorptive fraction, and the recovery percentage for the aggregate into the strongly adsorptive fraction are shown in the following table.

TABLE 28

| Fraction | Recovered component | Recovery percentage (%) |
|---|---|---|
| Weakly adsorptive fraction | Fragment 1 | Over 99 |
| | Fragment 2 | 98.0 |
| Intermediately adsorptive fraction | Antibody | 98.0 |
| Strongly adsorptive fraction | Aggregate | 98.0 |

—Separation Treatment Efficiency—

The separation treatment efficiency in Example 5 was 16.502 (L-feed solution)/(L-R)·h.

[Example 6] Multi-Column Gradient Simulated Moving-Bed Type

<Column>
Five columns having a size of an inner diameter of 10 mm×a length of 80 mm
<Feed Solution>
The NaCl concentration in the feed solution was set to 2.55 g/L.
<Eluent>
The following eluents were used.

TABLE 29

| Eluent type | NaCl concentration (g/L) of eluent |
|---|---|
| D1 | 17.53 |
| D2 | 2.55 |
| D3 | 0.00 |
| D4 | 2.03 |

<Operation Conditions>

The step (A) was configured by the combination of sub-steps illustrated in FIG. 15. This step (A) and the step (B) subsequent thereto were regarded as one set, and this one set was performed at five times and regarded as one cycle, and 10 cycles were performed. The flow velocities of the eluents (D1 to D4) and the feed solution (F) supplied in each step (A) were set as described below.

TABLE 30

| | Time (min) of sub-step | | Flow velocity (mL/min) | | |
|---|---|---|---|---|---|
| Sub-step (A1-6) | 5.98 | | D2 25.06 | | D4 1.91 |
| Sub-step (A2-6) | 8.24 | D1 2.35 | | D3 5.30 | F 21.05 |
| Sub-step (A3-6) | 3.31 | D1 2.92 | D2 10.55 | D3 2.66 | |

<Result>
—Recovery Percentage—

The recovery percentages for the fragments 1 and 2 into the weakly adsorptive fraction, the recovery percentage for the antibody into the intermediately adsorptive fraction, and the recovery percentage for the aggregate into the strongly adsorptive fraction are shown in the following table.

TABLE 31

| Fraction | Recovered component | Recovery percentage (%) |
|---|---|---|
| Weakly adsorptive fraction | Fragment 1 | Over 99 |
| | Fragment 2 | 98.0 |
| Intermediately adsorptive fraction | Antibody | 98.0 |
| Strongly adsorptive fraction | Aggregate | 98.0 |

—Separation Treatment Efficiency—

The separation treatment efficiency in Example 6 was 18.898 (L-feed solution)/(L-R)·h.

[Example 7] Multi-Column Gradient Simulated Moving-Bed Type

<Column>
Five columns having a size of an inner diameter of 10 mm×a length of 80 mm
<Feed Solution>
The NaCl concentration in the feed solution was set to 2.55 g/L.
<Eluent>
The following eluents were used.

TABLE 32

| Eluent type | NaCl concentration (g/L) of eluent |
|---|---|
| D1 | 17.53 |
| D2 | 2.55 |
| D3 | 0.00 |
| D4 | 2.03 |

<Operation Conditions>

The step (A) was configured by the combination of sub-steps illustrated in FIG. 17. This step (A) and the step (B) subsequent thereto were regarded as one set, and this one set was performed at five times and regarded as one cycle, and 10 cycles were performed. The flow velocities of the eluents (D1 to D4) and the feed solution (F) supplied in each step (A) were set as described below.

TABLE 33

| | Time (min) of one step | Flow velocity (mL/min) | | | | |
|---|---|---|---|---|---|---|
| Sub-step (A1-7) | 10.39 | D1 2.90 | | D3 4.56 | | F 18.54 |
| Sub-step (A2-7) | 3.66 | D1 2.90 | D2 8.95 | D3 2.20 | | |
| Sub-step (A3-7) | 8.25 | D1 2.49 | D2 21.42 | | D4 2.03 | |

<Result>
—Recovery Percentage—

The recovery percentages for the fragments 1 and 2 into the weakly adsorptive fraction, the recovery percentage for the antibody into the intermediately adsorptive fraction, and the recovery percentage for the aggregate into the strongly adsorptive fraction are shown in the following table.

TABLE 34

| Fraction | Recovered component | Recovery percentage (%) |
|---|---|---|
| Weakly adsorptive fraction | Fragment 1 | Over 99 |
| | Fragment 2 | 98.0 |
| Intermediately adsorptive fraction | Antibody | 98.0 |
| Strongly adsorptive fraction | Aggregate | 98.0 |

—Separation Treatment Efficiency—

The separation treatment efficiency in Example 7 was 16.502 (L-feed solution)/(L–R)·h.

Having described our invention as related to this embodiments and Examples, it is our intention that the invention not be limited by any of the details of the description, unless otherwise specified, but rather be construed broadly within its spirit and scope as set out in the accompanying claims.

This application claims priority on Patent Application No. 2018-215950 filed in Japan on Nov. 16, 2018, and Patent Application No. 2019-088523 filed in Japan on May 8, 2019, each of which is entirely herein incorporated by reference.

DESCRIPTION OF SYMBOLS

| | |
|---|---|
| 100 | Circulation system |
| 10a, 10b, 10c, 10d | Unit packed column (column) |
| Ab | Adsorbent |
| R1, R2, R3, R4 | Shutoff valve |
| 2a, 2b, 2c, 2d | Weakly adsorptive fraction extracting line |
| A1, A2, A3, A4 | Weakly adsorptive fraction extracting valve |
| 3a, 3b, 3c, 3d | Intermediately adsorptive fraction extracting line |
| B1, B2, B3, B4 | Intermediately adsorptive fraction extracting valve |
| 4a, 4b, 4c, 4d | Strongly adsorptive fraction extracting line |
| C1, C2, C3, C4 | Strongly adsorptive fraction extracting valve |
| T1, T2, T3, T4 | Check valve |
| 1 | Pipe |
| 2J | Weakly adsorptive fraction joining pipe |
| 3J | Intermediately adsorptive fraction joining pipe |
| 4J | Strongly adsorptive fraction joining pipe |
| 6 | Feed solution tank |
| 7 | Feed solution |
| 8a, 8b, 8c, 8d | Eluent tank |
| 9a, 9b, 9c, 9d | Eluent |
| 11 | Feed solution supplying line |
| 11a, 11b, 11c, 11d | Divergent feed solution supplying line |
| F1, F2, F3, F4 | Feed solution supplying valve |
| 12, 13, 14, 15 | Eluent supplying line |
| 12a, 12b, 12c, 12d | Divergent eluent supplying line |
| 13a, 13b, 13c, 13d | Divergent eluent supplying line |
| 14a, 14b, 14c, 14d | Divergent eluent supplying line |
| 15a, 15b, 15c, 15d | Divergent eluent supplying line |
| E1a, E2a, E3a, E4a | Eluent supplying valve |
| E1b, E2b, E3b, E4b | Eluent supplying valve |
| E1c, E2c, E3c, E4c | Eluent supplying valve |
| E1d, E2d, E3d, E4d | Eluent supplying valve |
| P1 | Circulation pump |
| P2 | Feed solution supply pump |
| P3, P4, P5, P6 | Eluent supply pump |

The invention claimed is:

1. A simulated moving-bed type chromatographic separation method comprising separating a weakly adsorptive component, a strongly adsorptive component, and an intermediately adsorptive component that has intermediate adsorptive property in relation to both components, with respect to an adsorbent, with two or more kinds of eluents by using a circulation system in which a plurality of unit packed columns packed with the adsorbent are connected in series and in an endless form via pipes, the weakly adsorptive component, the strongly adsorptive component, and the intermediately adsorptive component being contained in a feed solution, wherein a feed solution supply port F, two or more eluent supply ports D corresponding to the two or more kinds of eluents, an extraction port A of a weakly adsorptive fraction containing the weakly adsorptive component, an extraction port B of an intermediately adsorptive fraction containing the intermediately adsorptive component, and an extraction port C of a strongly adsorptive fraction containing the strongly adsorptive component are provided in the pipes of the circulation system, and positions of the feed solution supply port F, the extraction port A, the extraction port B, and the extraction port C are set as described in the following (a) to (c):

(a) the extraction port B is provided on the downstream side of the feed solution supply port F with at least one unit packed column interposed therebetween;

(b) the extraction port C is provided in the pipe having the feed solution supply port F or the extraction port C is provided on the upstream side of the feed solution supply port F with at least one unit packed column interposed therebetween; and (c) the extraction port A is provided in the pipe having the extraction port B or the extraction port A is provided on the downstream side of the extraction port B with at least one unit packed column interposed therebetween, and wherein the chromatographic separation method comprises sequentially repeating (A) and (B):

[(A)]

simultaneously or separately supplying the feed solution and the two or more kinds of eluents from the feed solution supply port F and the two or more eluent supply ports D respectively, and simultaneously or separately extracting the weakly adsorptive fraction, the intermediately adsorptive fraction, and the strongly adsorptive fraction from the extraction port A, the extraction port B, and the extraction port C respectively; and

[(B)]

shifting the feed solution supply port F, the eluent supply ports D, the extraction port A, the extraction port B, and the extraction port C to the downstream side, while maintaining a relative positional relationship therebetween, after finishing (A).

2. The simulated moving-bed type chromatographic separation method according to claim 1, wherein (A) further includes supplying the feed solution and not supplying the feed solution.

3. The simulated moving-bed type chromatographic separation method according to claim 1, wherein the extraction port C is provided on the downstream side of an eluent supply port D1 supplying an eluent d1 having the strongest desorption strength of the two or more kinds of eluents, at least one unit packed column is arranged between the eluent supply port D1 and the extraction port C, and in (A), during the eluent d1 is supplied, the same amount of the strongly adsorptive fraction as the amount of the eluent d1 supplied is extracted from the extraction port C.

4. The simulated moving-bed type chromatographic separation method according to claim 1, wherein the extraction port B is provided on the downstream side of an eluent supply port D2 supplying an eluent d2 having the second strongest desorption strength of the two or more kinds of eluents, at least one unit packed column is arranged between the eluent supply port D2 and the extraction port B, and in (A), during the eluent d2 is supplied, a time interval in which the same amount of the intermediately adsorptive fraction as the amount of the eluent d2 supplied is extracted from the extraction port B is provided.

5. The simulated moving-bed type chromatographic separation method according to claim 1, wherein four to six kinds of eluents each having different desorption strength are used.

6. The simulated moving-bed type chromatographic separation method according to claim 1, wherein the circulation system has four or more unit packed columns, the circulation system is divided into four sections 1 to 4 that are annularly continuous from the upstream side to the downstream side such that each section has at least one unit packed column, and the following methods (A1-1), (A2-1), and (A3-1) are performed in (A) by using the two or more kinds of eluents:

<(A1-1)>
supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying an eluent d-II from an eluent supply port D-II while using an upstream end of the section 2 as the eluent supply port D-II, supplying the feed solution from the feed solution supply port F while using an upstream end of the section 3 as the feed solution supply port F, and extracting the weakly adsorptive fraction from the extraction port A while using a downstream end of the section 4 as the extraction port A, thereby
most strengthening desorption strength of the eluent passing through the section 1,
weakening desorption strength of the eluent passing through the section 2 more than desorption strength of the eluent passing through the section 1, and
weakening desorption strength of the eluent passing through the sections 3 and 4 more than desorption strength of the eluent passing through the section 2;
<(A2-1)>
supplying the eluent d-I from the eluent supply port D-I, extracting the strongly adsorptive fraction from the extraction port C, supplying the eluent d-II from the eluent supply port D-II, supplying an eluent d-III from an eluent supply port D-III while using an upstream end of the section 3 as the eluent supply port D-III, and extracting the weakly adsorptive fraction from the extraction port A, thereby
most strengthening desorption strength of the eluent passing through the section 1,
weakening desorption strength of the eluent passing through the section 2 more than desorption strength of the eluent passing through the section 1, and
weakening desorption strength of the eluent passing through the sections 3 and 4 more than desorption strength of the eluent passing through the section 2; and
<(A3-1)>
supplying the eluent d-I from the eluent supply port D-I, extracting the strongly adsorptive fraction from the extraction port C, supplying the eluent d-II from the eluent supply port D-II, extracting the intermediately adsorptive fraction from the extraction port B while using a downstream end of the section 3 as the extraction port B, supplying an eluent d-IV from an eluent supply port D-IV while using an upstream end of the section 4 as the eluent supply port D-IV, and extracting the weakly adsorptive fraction from the extraction port A, thereby
most strengthening desorption strength of the eluent passing through the section 1,
weakening desorption strength of the eluent passing through the sections 2 and 3 more than desorption strength of the eluent passing through the section 1, and
weakening desorption strength of the eluent passing through the section 4 more than desorption strength of the eluent passing through the sections 2 and 3.

7. The simulated moving-bed type chromatographic separation method according to claim 1, wherein the circulation system has four or more unit packed columns, the circulation system is divided into four sections 1 to 4 that are annularly continuous from the upstream side to the downstream side such that each section has at least one unit packed column, and the following methods (A1-2), (A2-2), and (A3-2) are performed in (A) by using the two or more kinds of eluents:

<(A1-2)>
supplying an eluent d-II from an eluent supply port D-II while using an upstream end of the section 1 as the eluent supply port D-II, supplying the feed solution from the feed solution supply port F while using an upstream end of the section 3 as the feed solution supply port F, and extracting the weakly adsorptive fraction from the extraction port A while using a downstream end of the section 4 as the extraction port A, thereby
most strengthening desorption strength of the eluent passing through the sections 1 and 2, and
weakening desorption strength of the eluent passing through the sections 3 and 4 more than desorption strength of the eluent passing through the sections 1 and 2;
<(A2-2)>
supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying the eluent d-II from the eluent supply port D-II while using an upstream end of the section 2 as the eluent supply port D-II, supplying an eluent d-III from an eluent supply port D-III while using an upstream end of the section 3 as the eluent supply port D-III, and extracting the weakly adsorptive fraction from the extraction port A, thereby most strengthening desorption strength of the eluent passing through the section 1, weakening desorption strength of the eluent passing through the section 2 more than desorption strength of the eluent passing through the section 1, and weakening desorption strength of the eluent passing through the sections 3 and 4 more than desorption strength of the eluent passing through the section 2; and

<(A3-2)> supplying the eluent d-I from the eluent supply port D-I, extracting the strongly adsorptive fraction from the extraction port C, supplying the eluent d-II from the eluent supply port D-II in (A2-2), extracting the intermediately adsorptive fraction from the extraction port B while using a downstream end of the section 3 as the extraction port B, supplying an eluent d-IV from an eluent supply port D-IV while using an upstream end of the section 4 as the eluent supply port D-IV, and extracting the weakly adsorptive fraction from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the section 4 more than desorption strength of the eluent passing through the sections 2 and 3.

8. The simulated moving-bed type chromatographic separation method according to claim 1, wherein the circulation system has five or more unit packed columns, the circulation system is divided into five sections 1 to 5 that are annularly continuous from the upstream side to the downstream side such that each section has at least one unit packed column, and the following methods (A1-3), (A2-3), and (A3-3) are performed in (A) by using the two or more kinds of eluents:

<(A1-3)> supplying an eluent d-II from an eluent supply port D-II while using an upstream end of the section 1 as the eluent supply port D-II, supplying the feed solution from the feed solution supply port F while using an upstream end of the section 3 as the feed solution supply port F, supplying an eluent d-III from an eluent supply port D-III while using an upstream end of the section 4 as the eluent supply port D-III, and extracting the weakly adsorptive fraction from the extraction port A while using a downstream end of the section 5 as the extraction port A, thereby most strengthening desorption strength of the eluent passing through the sections 1 and 2, setting desorption strength of the eluent passing through the section 3 to be equal to desorption strength of the eluent passing through the sections 1 and 2 or weakening desorption strength of the eluent passing through the section 3 more than desorption strength of the eluent passing through the sections 1 and 2, and weakening desorption strength of the eluent passing through the sections 4 and 5 more than desorption strength of the eluent passing through the section 3; and

<(A2-3)> supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying the eluent d-II from the eluent supply port D-II while using an upstream end of the section 2 as the eluent supply port D-II, supplying the eluent d-III from the eluent supply port D-III, and extracting the weakly adsorptive fraction from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3; and

<(A3-3)> supplying the eluent d-I from the eluent supply port D-I, extracting the strongly adsorptive fraction from the extraction port C, supplying the eluent d-II from the eluent supply port D-II in (A2-3), extracting the intermediately adsorptive fraction from the extraction port B while using a downstream end of the section 4 as the extraction port B, supplying an eluent d-IV from an eluent supply port D-IV while using an upstream end of the section 5 as the eluent supply port D-IV, and extracting the weakly adsorptive fraction from the extraction port A, thereby most strengthening desorption strength of the eluent passing through the section 1, weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

9. The simulated moving-bed type chromatographic separation method according to claim 1, wherein the circulation system has seven or more unit packed columns, the circulation system is divided into five sections 1 to 5 that are annularly continuous from the upstream side to the downstream side such that each section has at least one unit packed column, and the following methods (A1-4), (A2-4), and (A3-4) are performed in (A) by using the two or more kinds of eluents:

<(A1-4)> supplying an eluent d-II from an eluent supply port D-II while using an upstream end of the section 1 as the eluent supply port D-II, supplying the feed solution from the feed solution supply port F while using an upstream end of the section 3 as the feed solution supply port F, supplying an eluent d-III from an eluent supply port D-III while using an upstream end of the section 4 as the eluent supply port D-III, and extracting the weakly adsorptive fraction from the extraction port A while using a downstream end of the section 5 as the extraction port A, thereby most strengthening desorption strength of the eluent passing through the sections 1 and 2, setting desorption strength of the eluent passing through the section 3 to be equal to desorption strength of the eluent passing through the sections 1 and 2 or weakening desorption strength of the eluent passing through the section 3 more than desorption strength of the eluent passing through the sections 1 and 2, and weakening desorption strength of the eluent passing through the sections 4 and 5 more than desorption strength of the eluent passing through the section 3; and

<(A2-4)> supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying the eluent d-II from the eluent supply port D-II while using an upstream end of the section 2 as the eluent supply port D-II, supplying an eluent d-IV from an eluent supply port D-IV while using an upstream end of the section 4 as the eluent supply port D-IV, and extracting the weakly adsorptive fraction from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3; and

<(A3-4)> supplying the eluent d-I from the eluent supply port D-I, extracting the strongly adsorptive fraction from the extraction port C, supplying the eluent d-II from the eluent supply port D-II in (A2-4), extracting the intermediately adsorptive fraction from the extraction port B while using a downstream end of the section 4 as the extraction port B, supplying an eluent d-V from an eluent supply port D-V while using an upstream end of the section 5 as the eluent supply port D-V, and extracting the weakly adsorptive fraction from the extraction port A, thereby most strengthening desorption strength of the eluent passing through the section 1, weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

10. The simulated moving-bed type chromatographic separation method according to claim 1, wherein the circulation system has five or more unit packed columns, the circulation system is divided into five sections 1 to 5 that are annularly continuous from the upstream side to the downstream side such that each section has at least one unit packed column, and the following methods (A1-5), (A2-5), and (A3-5) are performed in (A) by using the two or more kinds of eluents:

<(A1-5)> supplying the feed solution from the feed solution supply port F while using an upstream end of the section 3 as the feed solution supply port F, supplying an eluent d-III from an eluent supply port D-III while using an upstream end of the section 4 as the eluent supply port D-III, and extracting the weakly adsorptive fraction from the extraction port A while using a downstream end of the section 5 as the extraction port A, thereby most strengthening desorption strength of the eluent passing through the section 3, and weakening desorption strength of the eluent passing through the sections 4 and 5 more than desorption strength of the eluent passing through the section 3;

<(A2-5)> supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying an eluent d-II from an eluent supply port D-II while using an upstream end of the section 2 as the eluent supply port D-II, supplying the eluent d-III from the eluent supply port D-III, and extracting the weakly adsorptive fraction from the extraction port A, thereby most strengthening desorption strength of the eluent passing through the section 1, weakening desorption strength of the eluent passing through the sections 2 and 3 more than desorption strength of the eluent passing through the section 1, and weakening desorption strength of the eluent passing through the sections 4 and 5 more than desorption strength of the eluent passing through the sections 2 and 3; and

<(A3-5)> supplying the eluent d-I from the eluent supply port D-I, extracting the strongly adsorptive fraction from the extraction port C, supplying the eluent d-II from the eluent supply port D-II, extracting the intermediately adsorptive fraction from the extraction port B while using a downstream end of the section 4 as the extraction port B, supplying an eluent d-IV from an eluent supply port D-IV while using an upstream end of the section 5 as the eluent supply port D-IV, and extracting the weakly adsorptive fraction from the extraction port A, thereby most strengthening desorption strength of the eluent passing through the section 1, weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

11. The simulated moving-bed type chromatographic separation method according to claim 1, wherein the circulation system has five or more unit packed columns, the circulation system is divided into five sections 1 to 5 that are annularly continuous from the upstream side to the downstream side such that each section has at least one unit packed column, and the following methods (A1-6), (A2-6), and (A3-6) are performed in (A) by using the two or more kinds of eluents:

<(A1-6)>
supplying an eluent d-II from an eluent supply port D-II while using an upstream end of the section 1 as the eluent supply port D-II, extracting the intermediately adsorptive fraction from the extraction port B while using a downstream end of the section 3 as the extraction port B, supplying an eluent d-IV from an eluent supply port D-IV while using an upstream end of the section 4 as the eluent supply port D-IV, and extracting the weakly adsorptive fraction from the extraction port A while using a downstream end of the section 5 as the extraction port A, thereby
most strengthening desorption strength of the eluent passing through the sections 1, 2, and 3, and
weakening desorption strength of the eluent passing through the sections 3 and 5 more than desorption strength of the eluent passing through the sections 1, 2, and 3;

<(A2-6)>
supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying the feed solution from the feed solution supply port F while using an upstream end of the section 3 as the feed solution supply port F, supplying an eluent d-III from an eluent supply port D-III while using an upstream end of the section 4 as the eluent supply port D-III, and extracting the weakly adsorptive fraction from the extraction port A, thereby
most strengthening desorption strength of the eluent passing through the section 1,
weakening desorption strength of the eluent passing through the section 3 more than desorption strength of the eluent passing through the section 1, and
weakening desorption strength of the eluent passing through the sections 4 and 5 more than desorption strength of the eluent passing through the section 3; and <(A3-6)>
supplying the eluent d-I from the eluent supply port D-I, extracting the strongly adsorptive fraction from the extraction port C, supplying the eluent d-II from the eluent supply port D-II while using an upstream end of the section 2 as the eluent supply port D-II, supplying the eluent d-III from the eluent supply port D-III, and extracting the weakly adsorptive fraction from the extraction port A, thereby
most strengthening desorption strength of the eluent passing through the section 1,
weakening desorption strength of the eluent passing through the sections 2 and 3 more than desorption strength of the eluent passing through the section 1, and
weakening desorption strength of the eluent passing through the sections 4 and 5 more than desorption strength of the eluent passing through the sections 2 and 3.

12. The simulated moving-bed type chromatographic separation method according to claim 1, wherein the circulation system has five or more unit packed columns, the circulation system is divided into five sections 1 to 5 that are annularly continuous from the upstream side to the downstream side such that each section has at least one unit packed column, and the following methods (A1-7), (A2-7), and (A3-7) are performed in (A) by using the two or more kinds of eluents:

<(A1-7)>
supplying an eluent d-I from an eluent supply port D-I while using an upstream end of the section 1 as the eluent supply port D-I, extracting the strongly adsorptive fraction from the extraction port C while using a downstream end of the section 1 as the extraction port C, supplying the feed solution from the feed solution supply port F while using an upstream end of the section 3 as the feed solution supply port F, supplying an eluent d-III from an eluent supply port D-III while using an upstream end of the section 4 as the eluent supply port D-III, and extracting the weakly adsorptive fraction from the extraction port A while using a downstream end of the section 5 as the extraction port A, thereby
most strengthening desorption strength of the eluent passing through the section 1,
weakening desorption strength of the eluent passing through the section 3 more than desorption strength of the eluent passing through the section 1, and
weakening desorption strength of the eluent passing through the sections 4 and 5 more than desorption strength of the eluent passing through the section 3;

<(A2-7)>
supplying the eluent d-I from the eluent supply port D-I, extracting the strongly adsorptive fraction from the extraction port C, supplying an eluent d-II from an eluent supply port D-II while using an upstream end of the section 2 as the eluent supply port D-II, supplying the eluent d-III from the eluent supply port D-III, and extracting the weakly adsorptive fraction from the extraction port A, thereby
most strengthening desorption strength of the eluent passing through the section 1,
weakening desorption strength of the eluent passing through the sections 2 and 3 more than desorption strength of the eluent passing through the section 1, and
weakening desorption strength of the eluent passing through the sections 4 and 5 more than desorption strength of the eluent passing through the sections 2 and 3; and <(A3-7)>
supplying the eluent d-I from the eluent supply port D-I, extracting the strongly adsorptive fraction from the extraction port C, supplying the eluent d-II from the eluent supply port D-II, extracting the intermediately adsorptive fraction from the extraction port B while using a downstream end of the section 4 as the extraction port B, supplying an eluent d-IV from an eluent supply port D-IV while using an upstream end of the section 5 as the eluent supply port D-IV, and extracting the weakly adsorptive fraction from the extraction port A, thereby
most strengthening desorption strength of the eluent passing through the section 1,
weakening desorption strength of the eluent passing through the sections 2, 3, and 4 more than desorption strength of the eluent passing through the section 1, and weakening desorption strength of the eluent passing through the section 5 more than desorption strength of the eluent passing through the sections 2, 3, and 4.

13. A simulated moving-bed type chromatographic separation system separating a weakly adsorptive component, a strongly adsorptive component, and an intermediately adsorptive component that has intermediate adsorptive property in relation to both components, with respect to an adsorbent, with two or more kinds of eluents by using a circulation system in which a plurality of unit packed columns packed with the adsorbent are connected in series and in an endless form via pipes, the weakly adsorptive component, the strongly adsorptive component, and the intermediately adsorptive component being contained in a feed solution, wherein a feed solution supply port F, two or more eluent supply ports D corresponding to the two or more kinds of eluents, an extraction port A of a weakly adsorptive fraction containing the weakly adsorptive component, an extraction port B of an intermediately adsorptive fraction containing the intermediately adsorptive component, and an extraction port C of a strongly adsorptive fraction containing the strongly adsorptive component are provided in the pipes of the circulation system, and positions of the feed solution supply port F, the extraction port A, the extraction port B, and the extraction port C are set as described in the following (a) to (c):

(a) the extraction port B is provided on the downstream side of the feed solution supply port F with at least one unit packed column interposed therebetween;

(b) the extraction port C is provided in the pipe having the feed solution supply port F or the extraction port C is provided on the upstream side of the feed solution supply port F with at least one unit packed column interposed therebetween; and (c) the extraction port A is provided in the pipe having the extraction port B or the extraction port A is provided on the downstream side of the extraction port B with at least one unit packed column interposed therebetween, and wherein the chromatographic separation system is configured to sequentially repeat (A) and (B):

[(A)]

simultaneously or separately supplying the feed solution and the two or more kinds of eluents from the feed solution supply port F and the two or more eluent supply ports D respectively, and simultaneously or separately extracting the weakly adsorptive fraction, the intermediately adsorptive fraction, and the strongly adsorptive fraction from the extraction port A, the extraction port B, and the extraction port C respectively; and

[(B)]

shifting the feed solution supply port F, the eluent supply ports D, the extraction port A, the extraction port B, and the extraction port C to the downstream side, while maintaining a relative positional relationship therebetween, after finishing (A).

* * * * *

UNITED STATES PATENT AND TRADEMARK OFFICE
CERTIFICATE OF CORRECTION

| | | |
|---|---|---|
| PATENT NO. | : 11,839,835 B2 | Page 1 of 1 |
| APPLICATION NO. | : 17/277077 | |
| DATED | : December 12, 2023 | |
| INVENTOR(S) | : K. Okada et al. | |

It is certified that error appears in the above-identified patent and that said Letters Patent is hereby corrected as shown below:

On the Title Page

Item (56) Foreign Pat. Documents, page 2, Column 2, Line 4, please change "11/2018" to -- 01/2018 --

Signed and Sealed this
Seventeenth Day of September, 2024

Katherine Kelly Vidal
*Director of the United States Patent and Trademark Office*